United States Patent
Hughes et al.

(10) Patent No.: US 9,509,506 B2
(45) Date of Patent: Nov. 29, 2016

(54) QUANTUM KEY MANAGEMENT

(75) Inventors: Richard John Hughes, Los Alamos, NM (US); James Thomas Thrasher, Baltimore, MD (US); Jane Elizabeth Nordholt, Los Alamos, NM (US)

(73) Assignee: LOS ALAMOS NATIONAL SECURITY, LLC, Los Alamos, NM (US)

(*) Notice: Subject to any disclaimer, the term of this patent is extended or adjusted under 35 U.S.C. 154(b) by 901 days.

(21) Appl. No.: 13/599,816

(22) Filed: Aug. 30, 2012

(65) Prior Publication Data

US 2013/0083926 A1 Apr. 4, 2013

Related U.S. Application Data

(60) Provisional application No. 61/541,901, filed on Sep. 30, 2011.

(51) Int. Cl.
| | | |
|---|---|---|
| *H04L 9/08* | (2006.01) | |
| *H04L 9/32* | (2006.01) | |
| *G06F 21/31* | (2013.01) | |

(52) U.S. Cl.
CPC ............ *H04L 9/0836* (2013.01); *H04L 9/08* (2013.01); *H04L 9/0852* (2013.01); *H04L 9/321* (2013.01); *H04L 9/3247* (2013.01); *G06F 21/31* (2013.01)

(58) Field of Classification Search
CPC ....... H04L 9/08; H04L 9/0852; H04L 9/321; H04L 9/3247; G06F 21/31
USPC ......... 380/278, 255, 256, 277, 44, 259, 263, 380/279, 281, 286, 45, 47; 713/157, 158, 713/176, 180, 150, 168
See application file for complete search history.

(56) References Cited

U.S. PATENT DOCUMENTS 5,966,224 A 10/1999 Hughes et al.
6,263,435 B1 7/2001 Dondeti et al.
(Continued)

FOREIGN PATENT DOCUMENTS

CN 101599826 12/2009
EP 2081317 7/2009
(Continued)

OTHER PUBLICATIONS

AFP-JIJI Press, "Japanese Develop System to Prevent Mobile Phone Tapping," *JIJI Press*, 4 pp., downloaded from the World Wide Web (document marked Sep. 2, 2010).
(Continued)

*Primary Examiner* — Jeffrey Pwu
*Assistant Examiner* — Samuel Ambaye
(74) *Attorney, Agent, or Firm* — Wilmer Cutler Pickering Hale and Dorr LLP

(57) ABSTRACT

Innovations for quantum key management harness quantum communications to form a cryptography system within a public key infrastructure framework. In example implementations, the quantum key management innovations combine quantum key distribution and a quantum identification protocol with a Merkle signature scheme (using Winternitz one-time digital signatures or other one-time digital signatures, and Merkle hash trees) to constitute a cryptography system. More generally, the quantum key management innovations combine quantum key distribution and a quantum identification protocol with a hash-based signature scheme. This provides a secure way to identify, authenticate, verify, and exchange secret cryptographic keys. Features of the quantum key management innovations further include secure enrollment of users with a registration authority, as well as credential checking and revocation with a certificate authority, where the registration authority and/or certificate authority can be part of the same system as a trusted authority for quantum key distribution.

23 Claims, 15 Drawing Sheets

(56) References Cited

U.S. PATENT DOCUMENTS

| | | |
|---|---|---|
| 6,748,083 B2 | 6/2004 | Hughes et al. |
| 7,515,716 B1 | 4/2009 | Elliott |
| 7,587,654 B2 | 9/2009 | Matsumoto |
| 7,627,126 B1 | 12/2009 | Pikalo et al. |
| 7,725,026 B2 | 5/2010 | Patel et al. |
| 8,005,227 B1 | 8/2011 | Linnell et al. |
| 8,213,620 B1 | 7/2012 | Sussland et al. |
| 2001/0055389 A1 | 12/2001 | Hughes et al. |
| 2002/0010857 A1 | 1/2002 | Karthik |
| 2002/0199108 A1* | 12/2002 | Chuang ............... H04L 9/3247 713/176 |
| 2003/0002768 A1 | 1/2003 | Wood et al. |
| 2003/0098355 A1 | 5/2003 | Johnson |
| 2004/0017916 A1 | 1/2004 | Staddon et al. |
| 2004/0128509 A1 | 7/2004 | Gehrmann |
| 2005/0044356 A1 | 2/2005 | Srivastava et al. |
| 2005/0141716 A1 | 6/2005 | Kumar |
| 2006/0168446 A1 | 7/2006 | Ahonen et al. |
| 2006/0212936 A1 | 9/2006 | Berzanskis et al. |
| 2006/0263096 A1 | 11/2006 | Dinu et al. |
| 2007/0177735 A1 | 8/2007 | Mimih et al. |
| 2007/0192598 A1* | 8/2007 | Troxel et al. ............... 713/168 |
| 2007/0280689 A1 | 12/2007 | Boffi et al. |
| 2008/0031456 A1 | 2/2008 | Harrison et al. |
| 2008/0152147 A1 | 6/2008 | Xia et al. |
| 2009/0022322 A1 | 1/2009 | Trifonov |
| 2009/0092252 A1 | 4/2009 | Noll et al. |
| 2009/0150561 A1 | 6/2009 | Vig |
| 2009/0160670 A1 | 6/2009 | Sipple |
| 2009/0169015 A1 | 7/2009 | Watanabe |
| 2009/0175450 A1 | 7/2009 | Brandt |
| 2009/0175452 A1* | 7/2009 | Gelfond ............... H04L 9/0855 380/277 |
| 2009/0180615 A1 | 7/2009 | Trifonov |
| 2009/0180616 A1 | 7/2009 | Brodsky et al. |
| 2009/0180776 A1 | 7/2009 | Brodsky et al. |
| 2009/0185689 A1 | 7/2009 | Beal |
| 2009/0190759 A1 | 7/2009 | Peev et al. |
| 2009/0202074 A1 | 8/2009 | Trifonov et al. |
| 2009/0240913 A1 | 9/2009 | Obana et al. |
| 2009/0257755 A1 | 10/2009 | Buelow |
| 2009/0262942 A1 | 10/2009 | Maeda et al. |
| 2010/0226659 A1 | 9/2010 | Nishioka et al. |
| 2010/0257434 A1 | 10/2010 | Harrison et al. |
| 2011/0208971 A1* | 8/2011 | Bhattacharya et al. ...... 713/179 |

FOREIGN PATENT DOCUMENTS

| | | |
|---|---|---|
| KR | 10-0892763 | 4/2009 |
| WO | WO 2007/123869 | 11/2007 |
| WO | WO 2008/015758 | 2/2008 |
| WO | WO 2009/093034 | 7/2009 |
| WO | WO 2009/093036 | 7/2009 |
| WO | WO 2009/093037 | 7/2009 |
| WO | WO 2009/141586 | 11/2009 |
| WO | WO 2009/141587 | 11/2009 |
| WO | WO 2009/145392 | 12/2009 |

OTHER PUBLICATIONS

Arda, "A Quantum Information Science and Technology Roadmap—Part 2: Quantum Cryptography—Report of the Quantum Cryptography Technology Experts Panel," 100 pp. (Jul. 19, 2004).

Buttler et al., "Free-space Quantum Key Distribution," *Phys. Rev. A*, vol. 57, Issue 4, pp. 2379-2382 (Apr. 1998).

Buttler et al., "Practical Free-space Quantum Key Distribution over 1 km," *Physical Review Letters*, vol. 81, No. 15, pp. 3283-3286 (Oct. 1998).

Chapuran et al., "Optical Networking for Quantum Key Distribution and Quantum Communications," *New Journal of Physics*, vol. 11, 19 pp. (Oct. 2009).

Damgård et al., "Secure Identification and QKD in the Bounded-Quantum-Storage Model," *Proc. 27th Annual Int'l Cryptology Conf. on Advances in Cryptology*, pp. 342-359 (Aug. 2007).

Duligall et al., "Low Cost and Compact Quantum Key Distribution," *New Journal of Physics*, vol. 8, 16 pp. (Oct. 2006).

Federal Information Processing Standard Publication 197, "The Advanced Encryption Standard (AES)," 51 pp. (Nov. 2001).

Federal Information Processing Standard Publication 198, "The Keyed-Hash Message Authentication Code (HMAC)," 20 pp. (Mar. 2002).

Graham-Rowe, "My Name Is Bob and I Make E-shopping a Cinch," *New Scientist*, pp. 30-31 (Nov. 2007).

Harrington et al, "Enhancing Practical Security of Quantum Key Distribution with a Few Decoy States," 4 pp. (Mar. 2005).

Hillery et al., "Quantum Secret Sharing," *Physical Review A*, vol. 59, No. 3, pp. 1829-1834 (Mar. 1999).

Hughes et al, "Comment on 'Quantum Key Distribution with 1.25 Gbps Clock Synchronization' by J. C. Bienfang et al., quant-ph/0405097," 4 pp. (Jul. 2004).

Hughes et al., "Free-space Quantum Key Distribution in Daylight," *Journal of Modern Optics*, vol. 47, Issues 2-3, pp. 549-562 (Feb. 2000).

Hughes et al., "Practical Free-Space Quantum Cryptography," 17 pp. (1998).

Hughes et al., "Practical Free-space Quantum Key Distribution over 10 km in Daylight and at Night," *New Journal of Physics*, vol. 4, pp. 43.1-43.14 (Jul. 2002).

Hughes et al, "Practical Quantum Cryptography for Secure Free-space Communications," 12 pp. (May 1999).

Hughes et al., "Practical Quantum Key Distribution over a 48-km Optical Fiber Network," LA-UR-99-1593, 13 pp. (1999).

Hughes et al., "Quantum Cryptography over Underground Optical Fibers," *Advances in Cryptology*, 16 pp. (Jul. 1996).

Hughes et al., "Quantum Key Distribution," Los Alamos National Laboratory Physics Division, pp. 193-196 (Apr. 2004).

Hughes et al, "Secure Communications Using Quantum Cryptography," *Proc. SPIE Photonic Quantum Computing*, vol. 3076, pp. 2-11 (Jul. 1997).

ID Quantique SA, "CLAVIS2 Quantum Key Distribution for R&D Applications," 2 pp. (downloaded from the World Wide Web on Sep. 9, 2011).

ID Quantique SA, "Redefining Precision CLAVIS2: The Most Versatile Quantum Key Distribution Research Platform," 4 pp. (document marked Jan. 2010).

ID Quantique SA, "Redefining Security CERBERIS The Best of Classical and Quantum Worlds: Layer 2 Link Encryption with Quantum Key Distribution," 2 pp. (document marked Jan. 2010).

ID Quantique SA, "Separation of Duties: Dedicated vs Integrated Encryption Appliances," White Paper, Version 1.0, 8 pp. (Feb. 2011).

International Search Report dated Dec. 7, 2012, from International Application No. PCT/US2012/053467, 2 pp.

Kunz-Jacques et al., "Using Hash-Based Signatures to Bootstrap Quantum Key Distribution," 9 pp. (Sep. 2011).

Ma et al., "High Speed Quantum Key Distribution Over Optical Fiber Network System," Journal of Research of NIST, vol. 114, No. 3, 29 pp. (May-Jun. 2009).

MagiQ Technologies, Inc., "MAGIQ QPNTM 8505 Security Gateway Uncompromising VPN SecurityTM," 4 pp. (document marked 2007).

Menendez et al., "Network Applications of Cascaded Passive Code Translation for WDM-compatible Spectrally Phase-encoded Optical CDMA," Journal of Lightwave Technology, vol. 23, No. 10, 13 pp. (2005).

Mink, "Custom Hardware to Eliminate Bottlenecks in QKD Throughput Performance," *Proc. SPIE*, vol. 6780, 6 pp. (Sep. 2007).

Mitsubishi Electric Corporation, "Mitsubishi Electric Advance: Cryptography Edition," vol. 100, 29 pp. (Dec. 2002).

Mitsubishi Electric Corporation, "Mitsubishi Electric Advance: Information Security Technology," vol. 126, 27 pp. (Jun. 2009).

(56) References Cited

OTHER PUBLICATIONS

Mitsubishi Electric Corporation Press Release, "Mitsubishi, NEC, Tokyo University Realize Successful Interconnection of Quantum Encryption Networks for First Time in Japan," 4 pp. (document marked May 12, 2006).
Mitsubishi Electric, "One-time Pad Mobile Phone Software," 1 pp. (Oct. 2010).
National Institute of Information and Communications Technology Press Release, "Inauguration of the Tokyo QKD Network," 3 pp. (document marked Oct. 14, 2010).
Nordholt et al., "A New Face for Cryptography," Los Alamos Science, No. 27, pp. 68-85 (2002).
Nordholt et al., "Present and Future Free-space Quantum Key Distribution," *Proc. SPIE Free-Space Laser Communication Technologies XIV*, vol. 4635, pp. 116-126 (Apr. 2002).
Peev et al., "The SECOQC quantum key distribution network in Vienna," *New Journal of Physics*, vol. 11, 37 pp. (Jul. 2009).
Peters et al., "Dense Wavelength Multiplexing of 1550 nm QKD with Strong Classical Channels in Reconfigurable Networking Environments," *New Journal of Physics*, vol. 11, 17 pp. (Apr. 2009).
Quintessence Labs Pty Ltd., "Breakthrough Technology," "Optical Subsystem Module/Card," "Modules of Operation," and "Application Areas," 5 pp. (documents downloaded from the World Wide Web on Sep. 9, 2011).
Rass et al, "Quantum Coin-flipping-based Authentication," *IEEE*, 5 pp. (Jun. 2009).
Rosenberg et al., "Long-Distance Decoy-State Quantum Key Distribution in Optical Fiber," *Physical Review Letters*, vol. 98, 4 pp. (Jan. 2007).
Rosenberg et al., "Practical Long-distance Quantum Key Distribution System Using Decoy Levels" *New Journal of Physics*, vol. 11, 10 pp. (Apr. 2009).
Rosenberg et al., "Quantum Key Distribution at Telecom Wavelengths with Noise-free Detectors," 8 pp. (also published as Rosenberg et al., "Quantum Key Distribution at Telecom Wavelengths with Noise-free Detectors," *IEEE Applied Physics Letters*, vol. 88, Issue 2, pp. 21108-1-21108-3 (Jan. 2006)).
Runser et al., "Progress Toward Quantum Communications Networks: Opportunities and Challenges," *Optoelectronic Integrated Circuits IX*, vol. 6476, 15 pp. (Mar. 2007).
Schneider, "A Critical Look at Wireless Power," *IEEE Spectrum*, 10 pp. (May 2010).
SECOQC, "SECOQC White Paper on Quantum Key Distribution and Cryptography," Secoqc-WP-v5, 28 pp. (Jan. 22, 2007).
Shih et al., "New Efficient Three-Party Quantum Key Distribution Protocols," *IEEE Journal of Selected Topics in Quantum Electronics*, 15:6 p. 1602-1606 (Nov./Dec. 2009).
Toliver et al., "Demonstration of 1550 nm QKD with ROADM-based DWDM Networking and the Impact of Fiber FWM" *Conf. on Lasers and Electro-Optic*, 2 pp. (May 2007).
Toliver et al., "Experimental Investigation of Quantum Key Distribution Through Transparent Optical Switch Elements," *IEEE Photonics Technology Letters*, vol. 15, Issue II, pp. 1669-1671 (Nov. 2003).
Vittorio, "Quantum Cryptography: Privacy Through Uncertainty," ProQuest, 9 pp. (Oct. 2002).
Wegman et al., "New Hash Functions and Their Use in Authentication and Set Equality" *Journal of Computer and System Sciences*, vol. 22, Issue 3, pp. 265-279 (Jun. 1981).
Wikipedia, "Quantum Cryptography," 10 pp. (2010).
Wikipedia, "Key Distribution," 5 pp. (2010).
Wikipedia, "One-time Pad," 12 pp. (2010).
Written Opinion dated Dec. 7, 2012, from International Patent Application No. PCT/US2012/053467, 8 pp.
Yao, "Polarization in Fiber Systems: Squeezing out More Bandwidth," *The Photonics Handbook*, 5 pp. (2003).

\* cited by examiner generating digital signature keys at TA 101 and/or devices;
distributing verification information;
acquiring keys through point-to-point QKD with TA 101 distributing keys that were acquired
through QKD, digital signature keys
and/or verification information software 580 implementing one or more innovations for
quantum key management

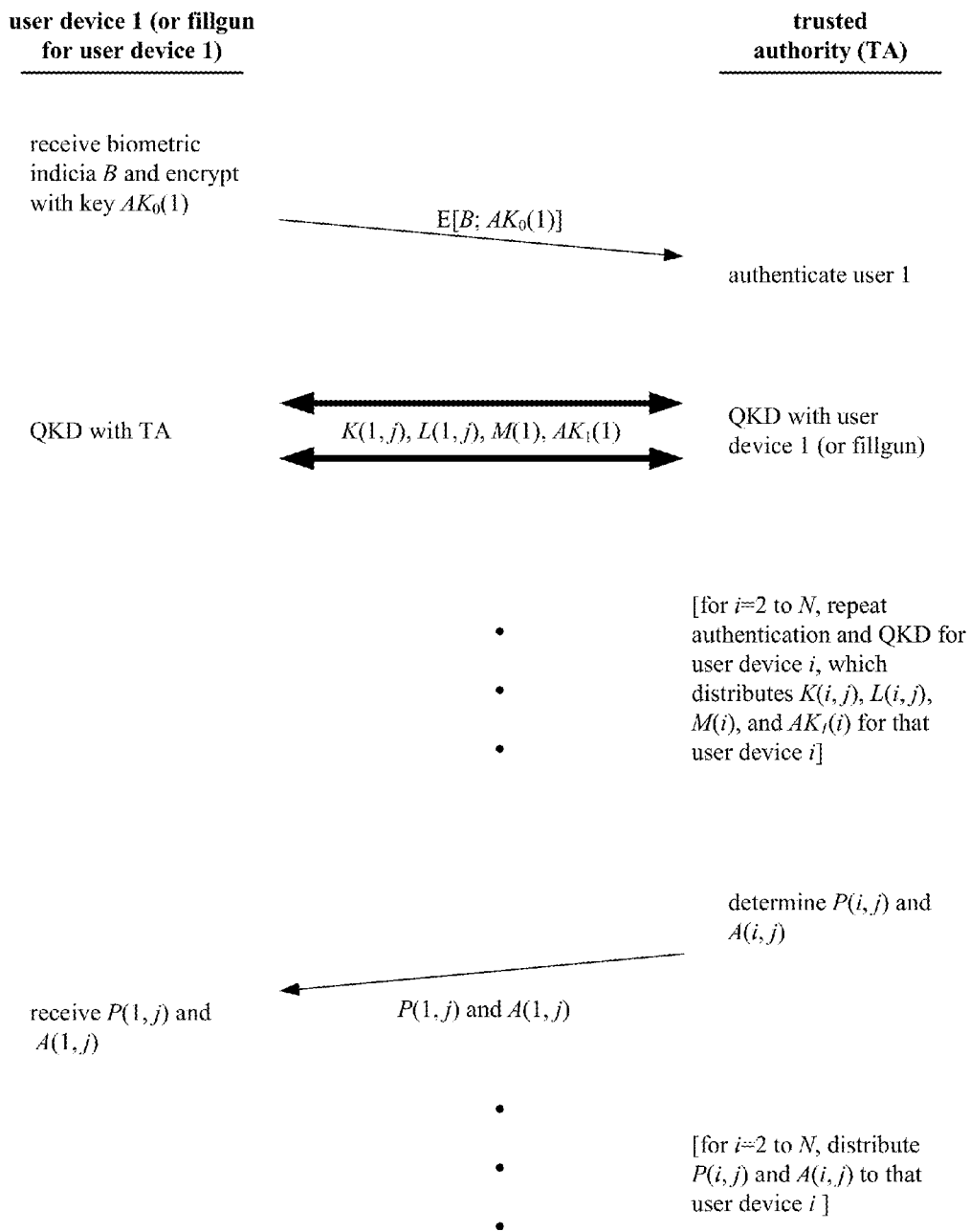

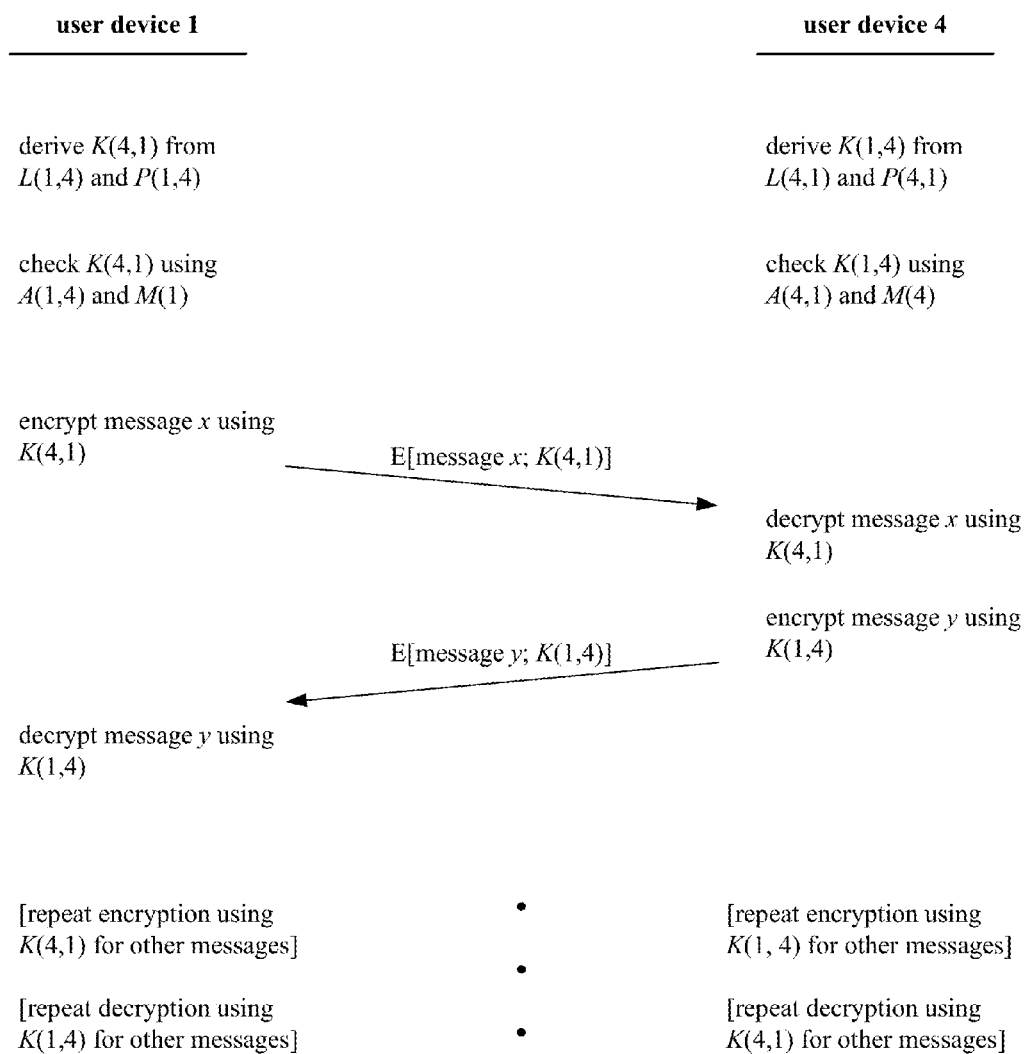

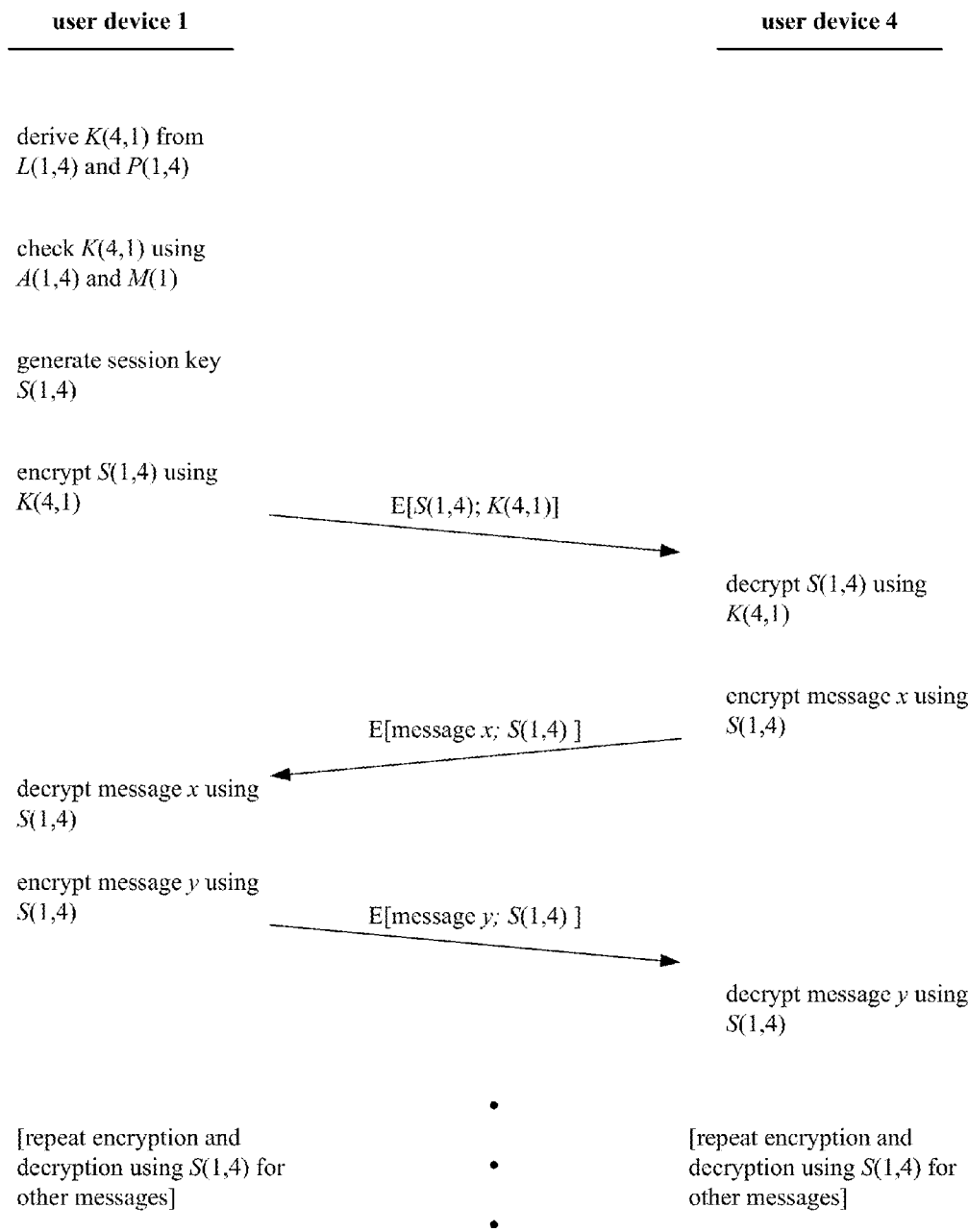

Figure 11
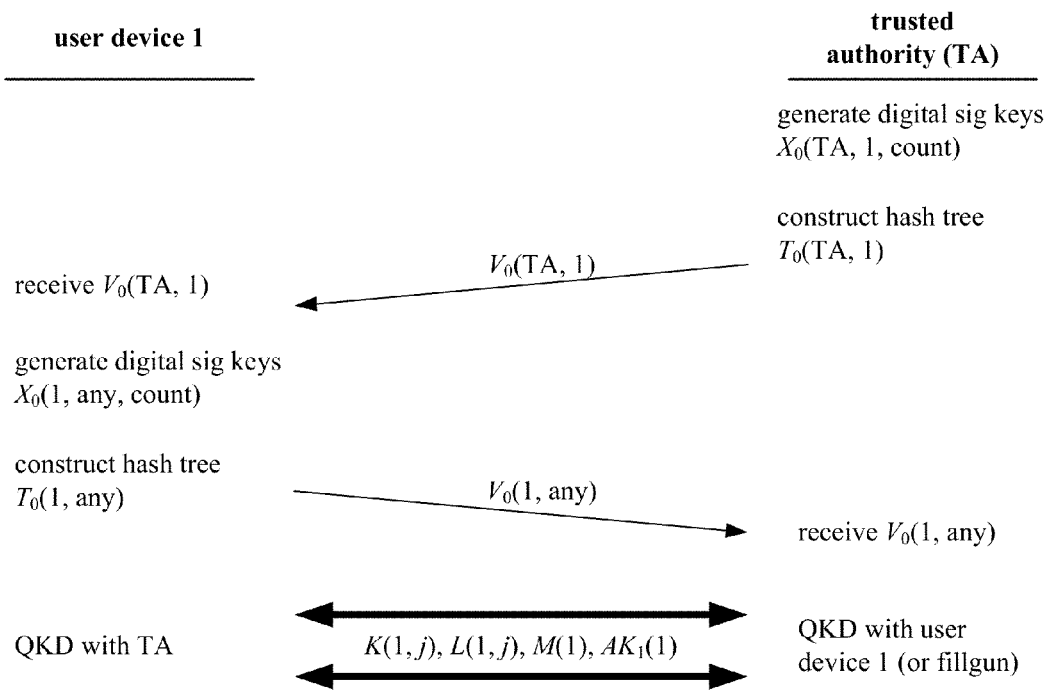
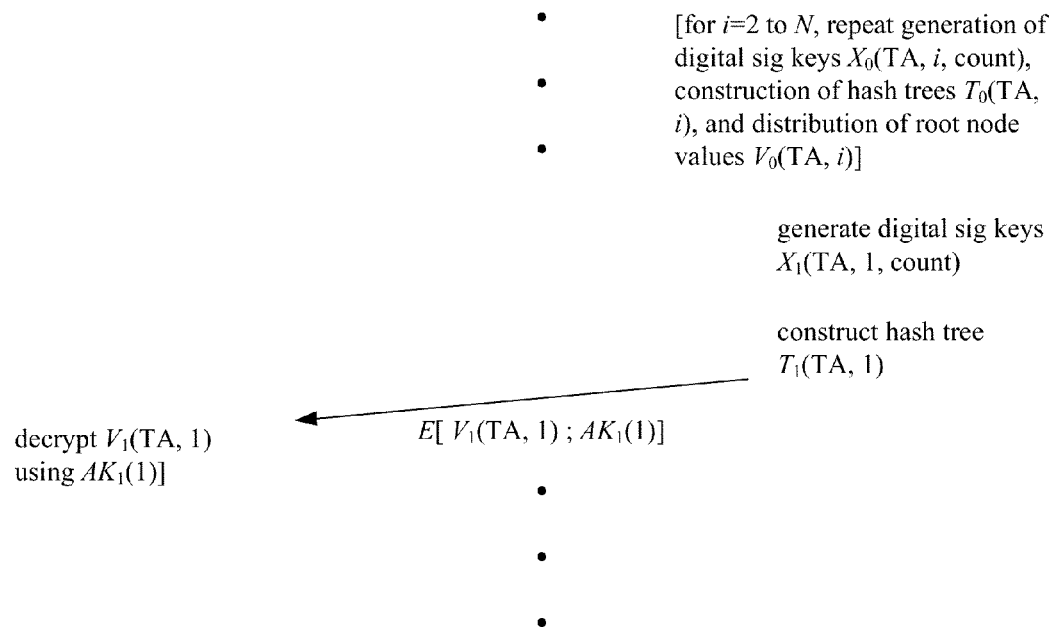

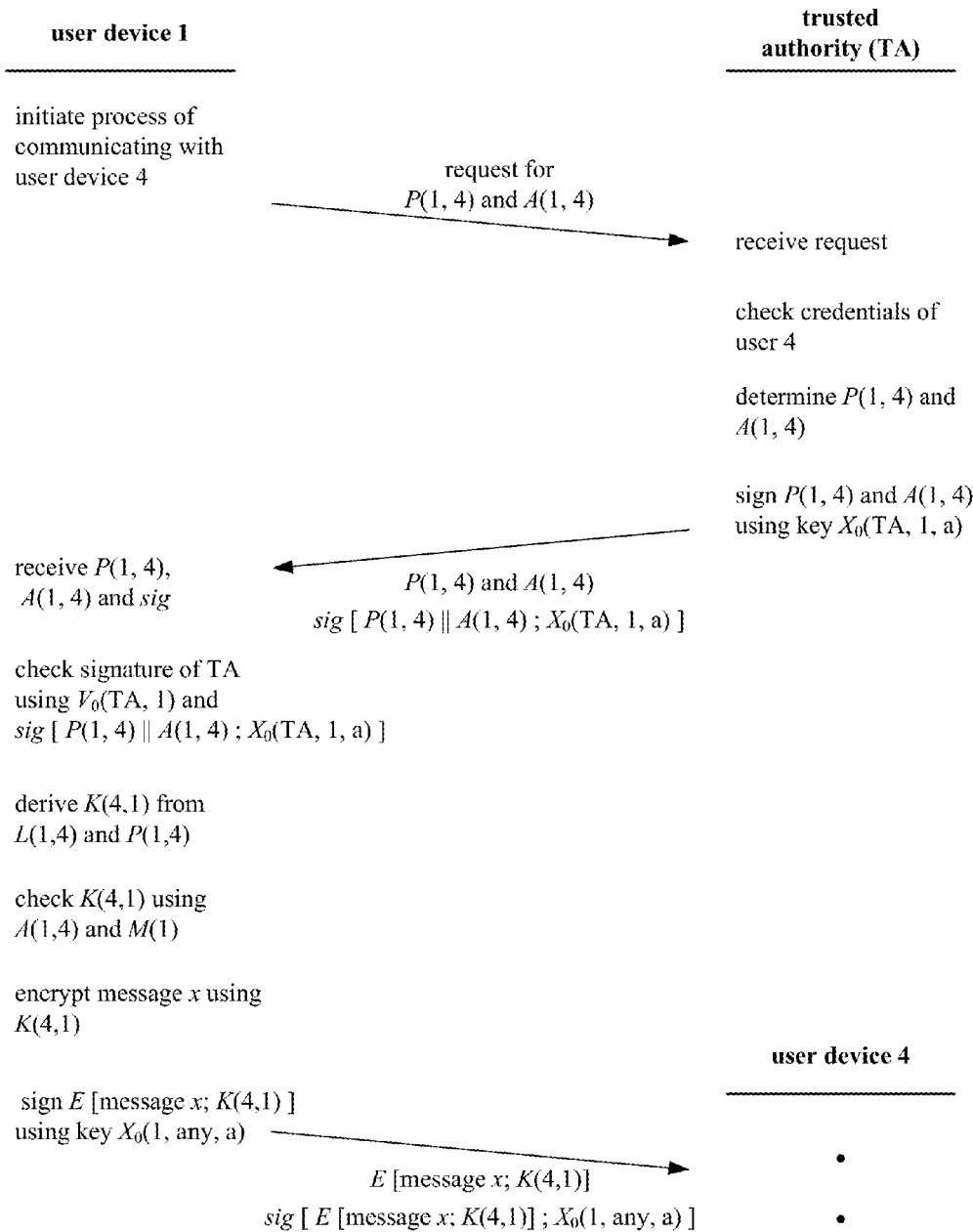

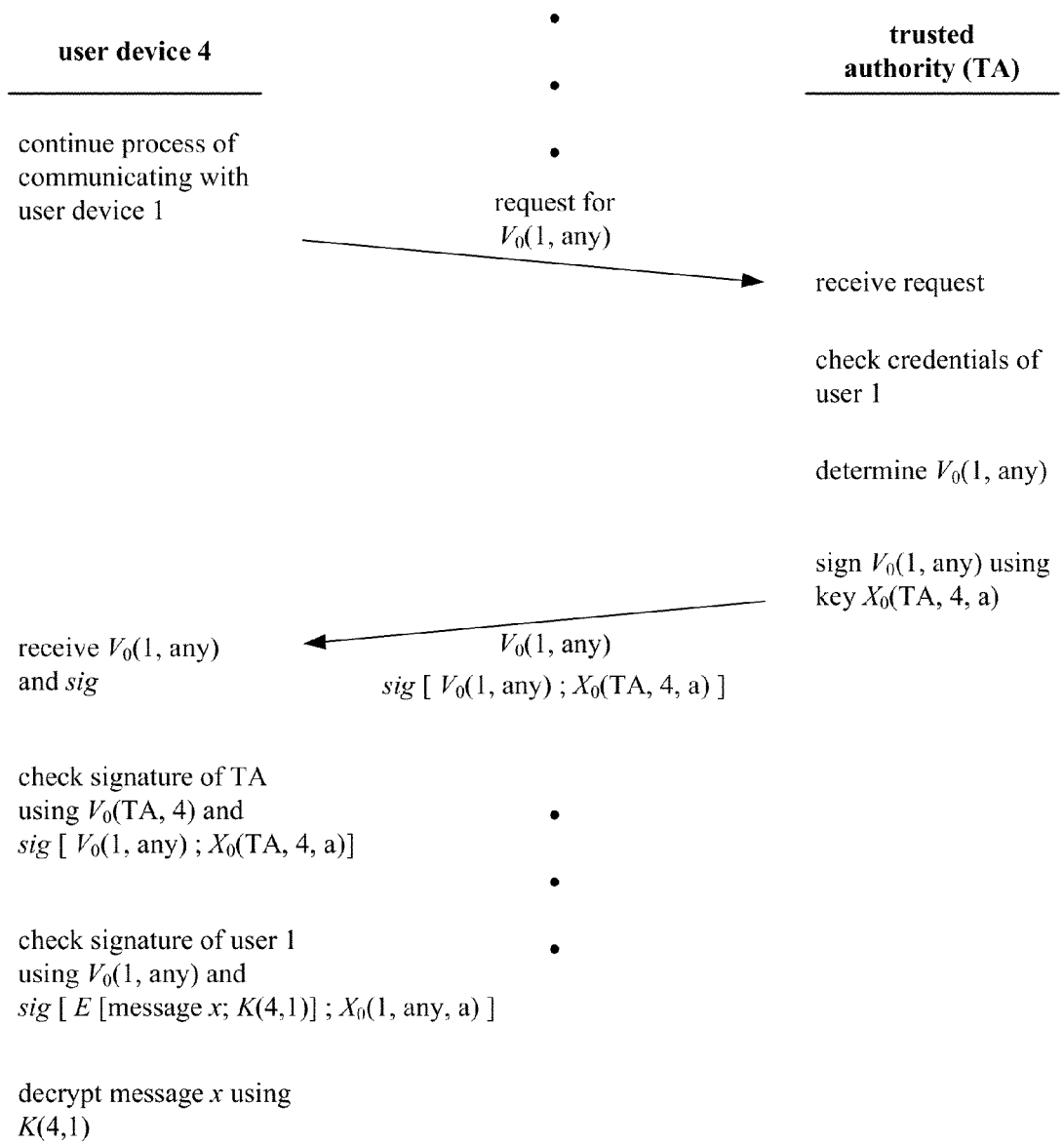

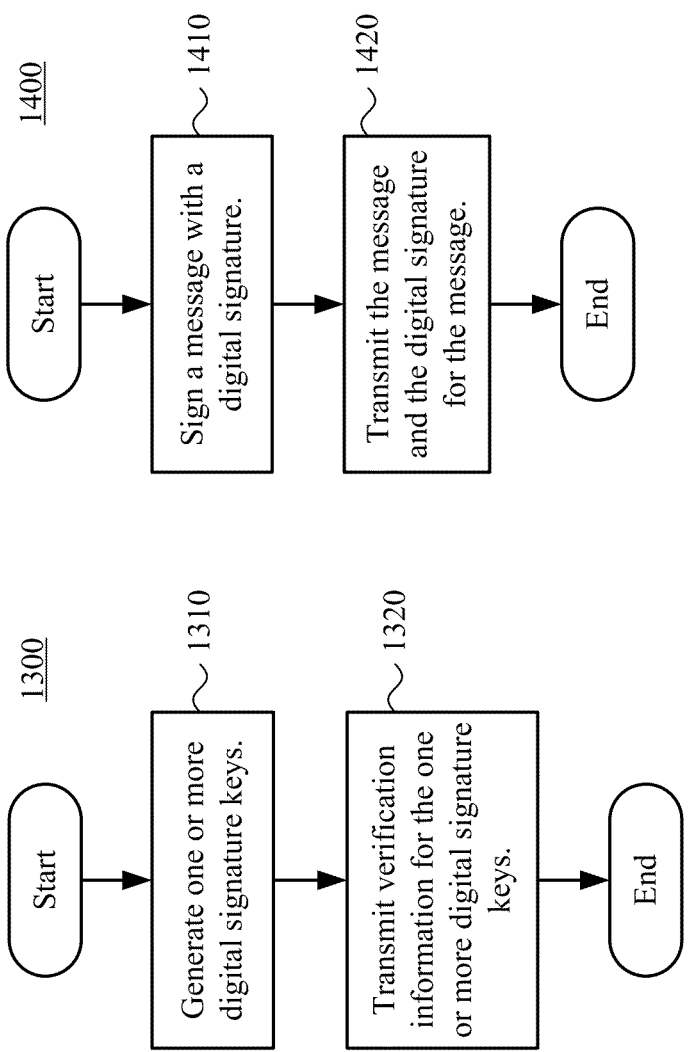
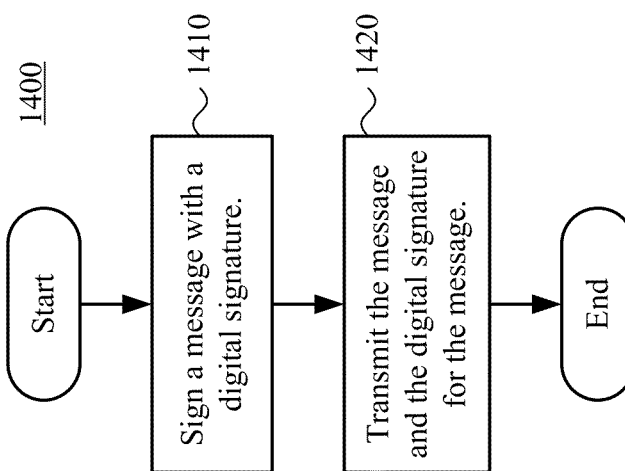
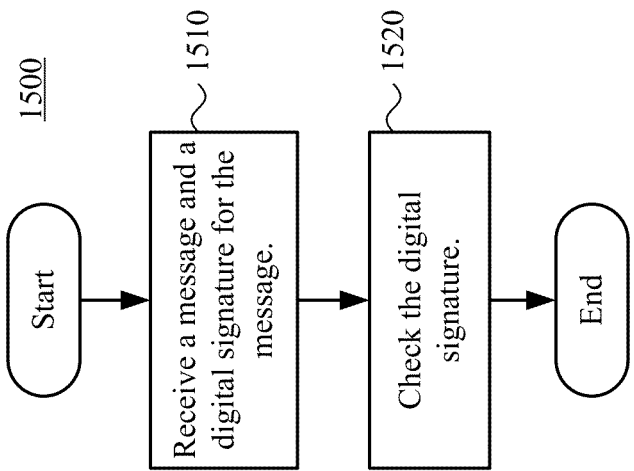

QUANTUM KEY MANAGEMENT

CROSS REFERENCE TO RELATED APPLICATION

The present application claims the benefit of U.S. Provisional Patent Application No. 61/541,901, filed Sep. 30, 2011, entitled "QUANTUM PUBLIC KEY CRYPTOGRAPHY," the disclosure of which is hereby incorporated by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages. The process of producing such keys through QC is also called quantum key distribution ("QKD").

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QKD, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear or diagonal), sets the polarization state for a photon in the selected basis, and records the bit value (0 or 1), the selected sending basis and the time of transmission.

TABLE 1

Example bases and quantum states.

| Basis | 0 | 1 |
| --- | --- | --- |
| Rectilinear (+) | 90° | 0° |
| Diagonal (x) | 45° | 135° (or −45°) |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set/measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

For the bases and states shown in Table 1, for example, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0 (90°) and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Other approaches to QC exploit other quantum properties (e.g., quantum entanglement) to exchange information encoded in quantum states. In addition, techniques such as privacy amplification can be used to eliminate the partial information that an eavesdropper can acquire. Techniques such as information reconciliation can be used to resolve small discrepancies in the shared bit values of the transmitter and receiver.

The theoretical framework for QC has been established for over 25 years, and its advantages in terms of security of keys are well accepted. Over the past two decades, implementations of QKD systems have become cheaper, more reliable, easier to maintain (e.g., self-tuning, self-checking), and easier to use. Even so, compared to other security solutions, QKD system have tended to be expensive and difficult to deploy. A typical QKD system is large and operates only in point-to-point mode over a fiber connection between transmitter and receiver. Several commercially available QKD systems perform QKD only over point-to-point links, are not portable, and require a dedicated fiber connection. Moreover, their QC cannot co-exist with network traffic. Smaller footprint, less expensive devices for QKD have recently been developed, which can engage in QC over the same channel as regular network traffic, and which can be used in conjunction with protocols for secure multi-party communication. These advances may help QKD gain a commercial foothold. Such QKD devices and technologies are not integrated with existing architectures for public key infrastructure, however, which may hinder their adoption.

A Public Key Infrastructure ("PKI") is a set of hardware, software, people, policies, and procedures used to create, manage, distribute, use, store, and revoke digital certificates. PKI is one of the fundamental building blocks of security on the Internet, and is used extensively for commercial sales, banking, communications and military systems. In a PKI, public keys are associated with user identities by means of a certificate authority. A user identity is unique within each certificate authority domain. Through a registration and issuance process, a certificate authority binds public keys with user identities, respectively. Depending on the level of assurance the binding has, the registration and issuance process may be carried out by software at a certificate authority or under human supervision. The registration authority is the entity in the PKI whose role is to assure and validate the binding. For a given user, the user identity, the public key, their binding, validity conditions and other attributes are made unforgeable in public key certificates issued by the certificate authority. Establishing a PKI and populating the user identities, public keys, certificates, etc. can involve considerable cost and effort, as well as the establishment of appropriate standards.

Current PKI systems typically use asymmetric cryptographic protocols such as RSA, El Gamal, elliptic curve cryptography and Diffie-Hellman for digital signatures and key exchange. These methods for digital signatures and key exchange are vulnerable to future advances that exploit increased computing power (e.g., a future quantum computer running Shor's algorithm) or flaws discovered in key generation algorithms. Even though such threats have not yet materialized, their possibility cannot be ruled out, which shows a potential retroactive vulnerability in today's secure communications.

SUMMARY

Innovations described herein provide methods for digital signatures and key distribution that can be integrated with various PKI architectures. Such innovations incorporate quantum communication and quantum key distribution, so they are resistant to future advances that exploit increased computing power or flaws discovered in conventional key generation algorithms.

According to a first set of innovations described herein, digital signature information is established in an environment with multiple user devices and a system that implements a trusted authority, which manages QKD in the environment. An entity generates one or more digital signature keys and transmits verification information for the one or more digital signature keys. For example, the one or more digital signature keys are Winternitz one-time digital signature keys, and the verification information is a signature verification key of a Merkle hash tree, the Merkle hash tree having the signature verification key as its root node value. Or, the verification information uses another hash-based signature scheme.

The entity can be a user device, which generates digital signature keys and transmits the verification information to a system that implements a registration authority. The system that implements the registration authority is typically the system that implements the trusted authority, but can be a different system in secure communication (more generally, has a trust relationship) with the system that implements the trusted authority. Or, the entity can be the registration authority, which generates digital signature keys and transmits the verification information to one of the user devices. Or, the registration authority and each of the user devices can generate digital signature keys and transmit verification information.

According to a second set of innovations described herein an identity or certification is asserted in an environment with multiple user devices and a system that implements a trusted authority, which manages QKD in the environment. An entity (e.g., user device, certificate authority) signs a message with a digital signature and transmits the message and the digital signature for the message. For example, the message and the digital signature are transmitted to a first user device by a system that implements a certificate authority, where the message is a non-secret key of a second user device. The certificate authority is typically the trusted authority, but alternatively the system that implements the certificate authority can be a different system in secure communication (more generally, has a trust relationship) with the system that implements the trusted authority. Or, a first user device performs the signing and the transmitting, and the message and the digital signature are transmitted to second user device.

According to a third set of innovations described herein, an identity or certification is verified in an environment with multiple user devices and a system that implements a trusted authority, which manages QKD in the environment. An entity (e.g., user device, certificate authority) receives a message and a digital signature for the message, and the entity checks the digital signature. For example, a user device performs the receiving and the checking, using verification information received from a system that implements a certificate authority to check identification of or certification by the certificate authority for the digital signature for the message. The certificate authority is typically the trusted authority, but the roles can alternatively be implemented in separate systems in secure communication (more generally, having a trust relationship).

According to a fourth set of innovations described herein, a certificate authority verifies credentials in an environment with multiple user devices and a system that implements a trusted authority, which manages QKD in the environment. The certificate authority receives a request, from a first user device, for information regarding a second user device. For example, the information is a non-secret key or verification information. The certificate authority checks the status of credentials for the second user device. If the status of credentials for the second user device satisfies one or more evaluation criteria (e.g., not revoked), the certificate authority transmits the information to the first user device.

The foregoing and other objects, features, and advantages of the invention will become more apparent from the following detailed description, which proceeds with reference to the accompanying figures.

BRIEF DESCRIPTION OF THE DRAWINGS

FIG. 6 is a diagram illustrating an example protocol that includes QKD between a trusted authority and one or more user devices for secure multi-party communication.

FIGS. 7a and 7b are diagrams illustrating protocols for modes of operation in secure multi-party communication between user devices.

FIG. 11 is a diagram illustrating a protocol for generating digital signature keys and exchanging verification information for the digital signature keys, for use in secure multi-party communication with QKD.

FIGS. 12a and 12b are diagrams illustrating a protocol for asserting and verifying identity or certification as part of secure multi-party communication with QKD.

FIGS. 13-16 are flowcharts illustrating generalized techniques for establishing digital signature information, asserting identity or certification, verifying identity or certification, and verifying credentials, respectively, in an environment with multiple user devices and a system that implements a trusted authority, which manages QKD in the environment.

DETAILED DESCRIPTION

Figure 1:
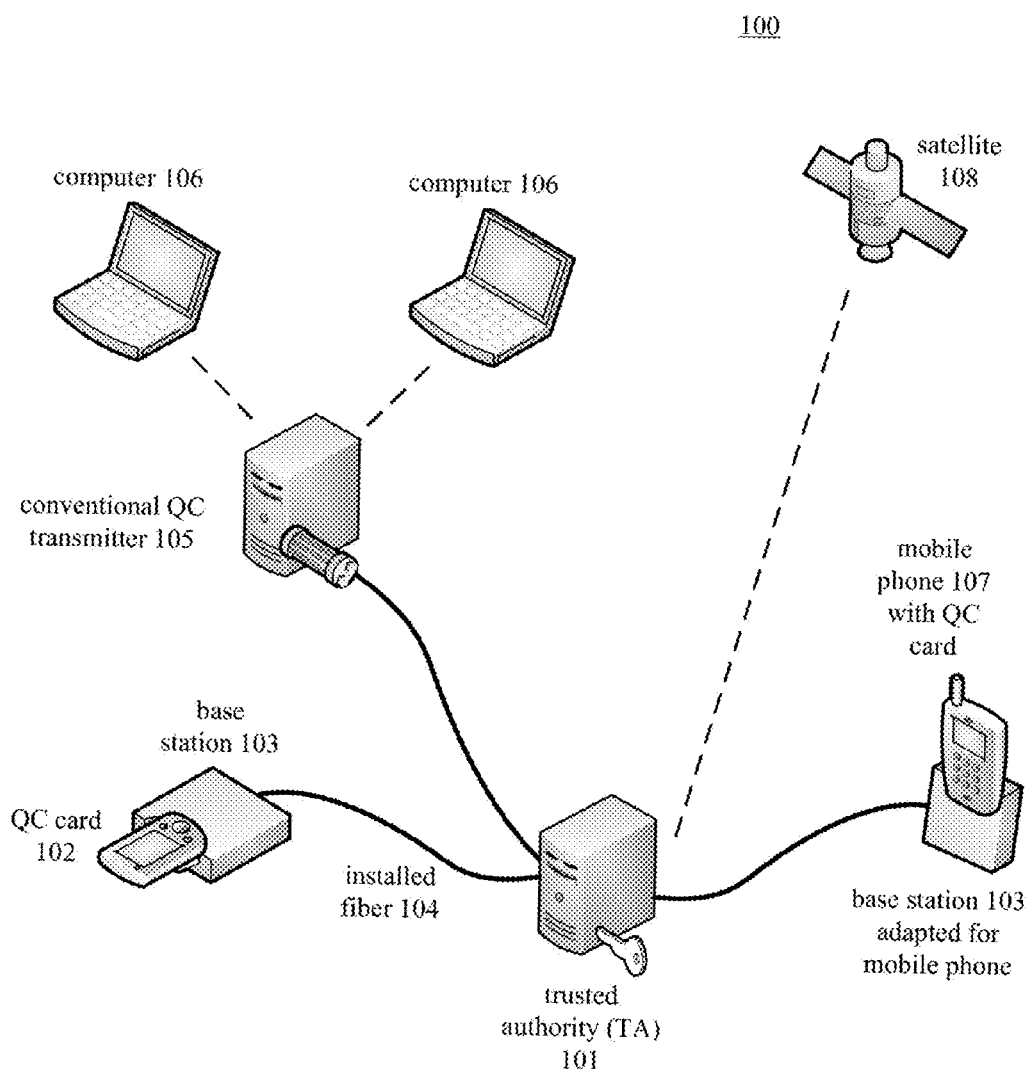
FIGS. 1, 2 and 3 are diagrams of example operating environments in which keys are acquired through QKD, disseminated, and used for encryption, authentication and access control.

Innovations for quantum key management ("QKM") are described herein. The QKM innovations harness QC to form a cryptography system within a PKI framework. Security of the system is rooted in fundamental physics principles. In example implementations, the QKM innovations combine QKD and a quantum identification protocol ("QIP") with a Merkle signature scheme (using Winternitz one-time digital signatures or other one-time digital signatures, and Merkle hash trees) to constitute a cryptography system. More generally, the QKM innovations combine QKD and a QIP with a hash-based signature scheme. This provides a secure way to identify, authenticate, verify, and exchange secret cryptographic keys.

In particular, the QKM innovations can be used in an environment in which users can perform QC with a trusted authority, but not with each other, to establish secret keys for securing user-to-user communications. The QKM innovations introduce a non-repudiation capability, using digital signatures. The trusted authority provides the usual certificate authority functions of a PKI, including enrollment, signing of users' non-secret keys that are used to form shared secret keys, and verification of users' signatures.

In the example implementations, various features of the system are computationally lightweight and relatively fast, and can be implemented in hardware relatively efficiently, when compared to current methods based on asymmetric key cryptography. This makes the QKM innovations especially suitable for use in devices with constrained resources such as handheld devices and in smart grid applications.

In the example implementations, the QKM innovations are scalable, relatively simple to deploy and manage, and compatible with the certificate authority infrastructure of current PKI architectures (such as ANSI X.509). The QKM innovations include ways to replenish one-time digital signature keys (and accompanying signature verification keys) securely, which is a feature that is missing from many current PKI approaches. The QKM innovations can scale to a large number of user devices that interoperate with a trusted authority for QKD, which also acts as certificate authority for PKI purposes. In example implementations, the QKM innovations can be implemented in a hierarchical manner, allowing disjoint domains or communities of interest to be bridged through an intermediary trusted authority. Compatibility with existing certificate authority infrastructure reduces the costs of deploying and managing the QKM innovations.

The QKM innovations can be used in various applications that involve secure communications, including commercial sales, banking, conferencing and military systems. The QKM innovations can be used to secure enterprise networks or industrial control systems, provide consumer services in secure ways, or provide access control and identification token.

For the sake of presentation, in some places, the term "trusted authority" is used as shorthand for a computing system that implements the role of trusted authority, and the term "user" is used to indicate a computing system associated with a user. Unless the context clearly indicates otherwise, operations described herein are implemented with and performed by computing systems. For example, description of transmission of information to a trusted authority or user, determination of a value, and receipt of information from a trusted authority or user generally indicate operations with a computing system associated with the trusted authority or user. On the other hand, description of user input or biometric input to a user device implies a human user providing such input.

In addition, the terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose computer hardware with software implementing the functionality described herein. The term "user device" generally indicates a computing system associated with a user.

Various alternatives to the implementations described herein are possible. Certain techniques described with reference to flowchart diagrams can be altered by changing the ordering of stages shown in the flowcharts, by splitting, repeating or omitting certain stages, etc. Different aspects of the QKM described herein can be used in combination or separately. Different embodiments implement one or more of the described techniques and tools. Some of the techniques and tools described herein address one or more of the problems noted in the background. Typically, a given technique/tool does not solve all such problems.

I. Example Operating Environments.

FIG. 1 shows an example operating environment (100) in which various user devices acquire keys through QKD with a trusted authority (101). The user devices include a QC card (102) that couples with a base station (103), a mobile phone (107) that has a QC card, a satellite (108), and several computers (106) connected to a conventional QC transmitter (105). A user device can be for an individual user or for a business, financial institution or government institution as user.

A computing system implements the trusted authority (101). The trusted authority (101) authenticates a user, produces quantum keys in communication with a user device (or conventional QC transmitter (105)), and stores the quantum keys. At some point, the trusted authority (101) performs QKD with different devices, and the trusted authority (101) stores quantum keys produced in the different QKD sessions. Thus, with reference to conventional roles for certain cryptographic protocols, the trusted authority (101) can generally act as a key distribution center (by generating/distributing quantum keys to user devices) and key translation center (by maintaining a database of quantum keys and other information used for QKD, and responding to requests for such information). Using quantum keys and other information provided by the trusted authority (101), a given user device can securely communicate with other user devices that have quantum keys from QKD with the trusted authority (101).

The QC card (102) contains a miniaturized QC transmitter. The QC card (102) couples with a base station (103), which provides a network connection with the trusted authority (101) and can provide electric power to the QC card (102). Example implementations for a base station (103), QC card (102), and trusted authority adapted for QKD with a QC card (102) are detailed in U.S. patent application Ser. No. 12/895,367, filed Sep. 30, 2010, whose international counterpart application PCT/US2011/054061 has been published as WO 2012/044852. Whereas conventional QKD solutions have tended to be expensive and difficult to deploy, example implementations of the QC card (102) and base station (103) are relatively inexpensive. A QC card (102) is easily carried, and quantum keys generated with QKD facilitate security that is stronger than that provided with conventional non-quantum key distribution.

To generate quantum keys, a user inserts the QC card (102) into the base station (103). Typically, as a precondition for QKD, the trusted authority (101) authenticates the user. For example, the QC card (102) accepts a fingerprint scan and personal identification number ("PIN") from the user, encrypts the PIN and fingerprint scan data, and transmits the encrypted material to the trusted authority (101) for comparison against information previously provided to the trusted authority (101). Alternatively, the QC card (102) accepts other biometric information and/or other information that identifies the user.

At this time, the trusted authority (101) can generate one-time digital signature keys as well as verification information for the digital signature keys. The trusted authority transmits the verification information to the QC card (102), for later use in verifying messages from the trusted authority. The QC card (102) can generate its own one-time digital signature keys and verification information for its digital signature keys. The QC card (102) transmits such verification information to the trusted authority (101), for later use in verifying messages from the user of the QC card (102).

The QC card (102) then performs QKD with the trusted authority (101) and stores the resulting quantum keys in secure memory on the QC card (102). In FIG. 1, the base station (103) is connected to the trusted authority (101) over installed fiber (104). The installed fiber (104) is used as a quantum channel for point-to-point QKD between the QC card (102) and trusted authority (101), for example, for transmission of photons encoded with quantum state information. The point-to-point QKD can happen over a single optical span or multiple spans in a fiber network whose topology supports QKD. For example, the topology includes intermediate routers between the QC card and trusted authority, but the routers preserve quantum state information. In FIG. 1, the installed fiber (104) is also used as a public channel to exchange non-quantum information between the QC card (102) and trusted authority (101), for example, authentication information, non-quantum information about measuring bases, recording basis in the QKD, and/or non-secret key information from the trusted authority (101). Alternatively, the QC card (102) and trusted authority (101) communicate non-quantum information over another type of network media (e.g., copper, RF) or free space (optical), or over a fiber network having another network topology.

In one use scenario, a business purchases QC cards (102) for its employees and purchases one or more base stations (103) located at its facilities. An employee periodically plugs his or her QC card (102) into a base station to load up on quantum keys. The QC card (102) can also receive verification information for digital signature keys, or generate digital signature keys and verification information. The employee can then use the quantum keys for activities such as purchasing over the Internet, authentication or access control at a remote site.

The mobile phone (107) includes a QC card (102) as well as conventional mobile phone components. The mobile phone (107) couples with a base station (103) that is adapted to connect to the mobile phone (107) and provides a network connection to the trusted authority (101). The mobile phone's base station (103) can also provide electric power and a data connection for synchronization of information on the mobile phone (107). The mobile phone (107) stores quantum keys produced by the QC card (102) and trusted authority (101). The mobile phone (107) can also generate digital signature keys (and corresponding verification information), and receive and store verification information from the trusted authority (101). Example implementations for a mobile phone (107) that includes a QC card are described below.

As shown in FIG. 1, the trusted authority (101) can also produce quantum keys for devices other than a QC card (102), and generate digital signature keys (and verification information) for such other devices. For example, the trusted authority (101) performs QKD to distribute quantum keys to a low-orbit satellite (108) using equipment for QC transmission and reception through free space. Or, the trusted authority (101) performs QKD with a conventional QC transmitter (105), which directly conveys the quantum keys produced by QKD to a locally connected computer (106) at a secure facility. The conventional QC transmitter (105) can connect to the trusted authority (101) over installed fiber (104) (e.g., standard fiber for telecommunications in a building, FTTx link, metro area, etc.) or free space (e.g., rooftop to rooftop, airplane to ground, ship to ship, satellite to ground).

In any case, the QKD produces cryptographic-quality secret random numbers, which can be used as quantum keys for encryption, secure multi-party audio or video communication, authentication, bank transactions, facility access control, access control for a computing system or database, access control for an online control system, vehicle access, digital signatures, e-voting, tele-presence or another application. As random numbers, the quantum keys have forward secrecy. The quantum keys do not depend on any pre-placed secret key, and they are not subject to conventional attacks, nor are they vulnerable to future advances that exploit increased computing power or flaws discovered in key generation algorithms. The trusted authority (101) can generate digital signature keys to identify the trusted authority (101) to any device, in which case the trusted authority sends corresponding verification information to that device. The trusted authority (101) can receive verification information from any device (corresponding to digital signature keys generated by the device) for use by the trusted authority or another device in identifying the device.

Some of the quantum keys produced by QKD can be used for authentication and other set-up operations before subsequent QKD sessions, so that such set-up operations are automatic and seamless to the user. For example, such quantum keys can be used when replenishing digital signature keys and communicating new verification information for the new digital signature keys.

In the examples shown in FIG. 1, the computing system that implements the trusted authority (101) has a QC receiver. Alternatively, computing system that implements the trusted authority (101) has a QC transmitter, and the other party to QKD includes a QC receiver.

Figure 2:
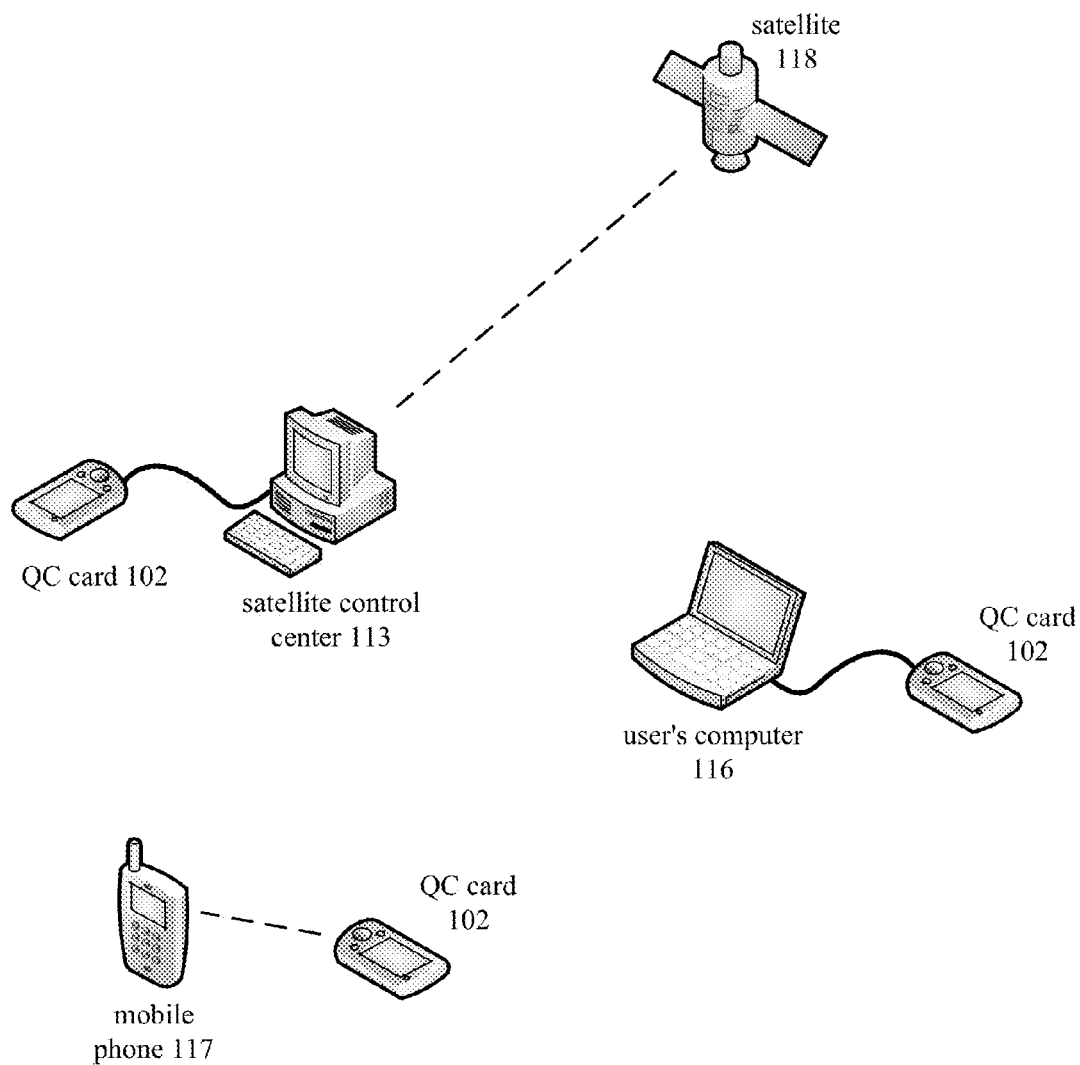

FIG. 2 shows an example operating environment (200) in which a QC card (102) further distributes quantum keys obtained through QKD with the trusted authority (101). A QC card (102) can distribute stored quantum keys to a mobile phone (117) or a user's computer (116). For example, the QC card (102) transmits the quantum keys over a point-to-point fiber connection or wireless connection. Or, a QC card (102) provides quantum keys to a satellite control center (113), which uploads the quantum keys to a satellite (118). The QC card (102) can similarly distribute digital signature keys it has generated and/or verification information it has received.

In this way, the QC card (102) can be used as a "fillgun" to load quantum keys (as well as digital signature keys and/or verification information) from its secure memory into a remote encryptor on a spacecraft, naval vessel or other vehicle. For example, the QC card (102) loads up with quantum keys (as well as digital signature keys and/or verification information) while coupled with a base station at a terminal, is carried to a spacecraft before launch, and then loads the quantum keys (as well as digital signature keys and/or verification information) onto a computing device aboard the spacecraft. The computing device aboard the spacecraft can then use the quantum keys for secure communication with the terminal or another device.

Figure 3:
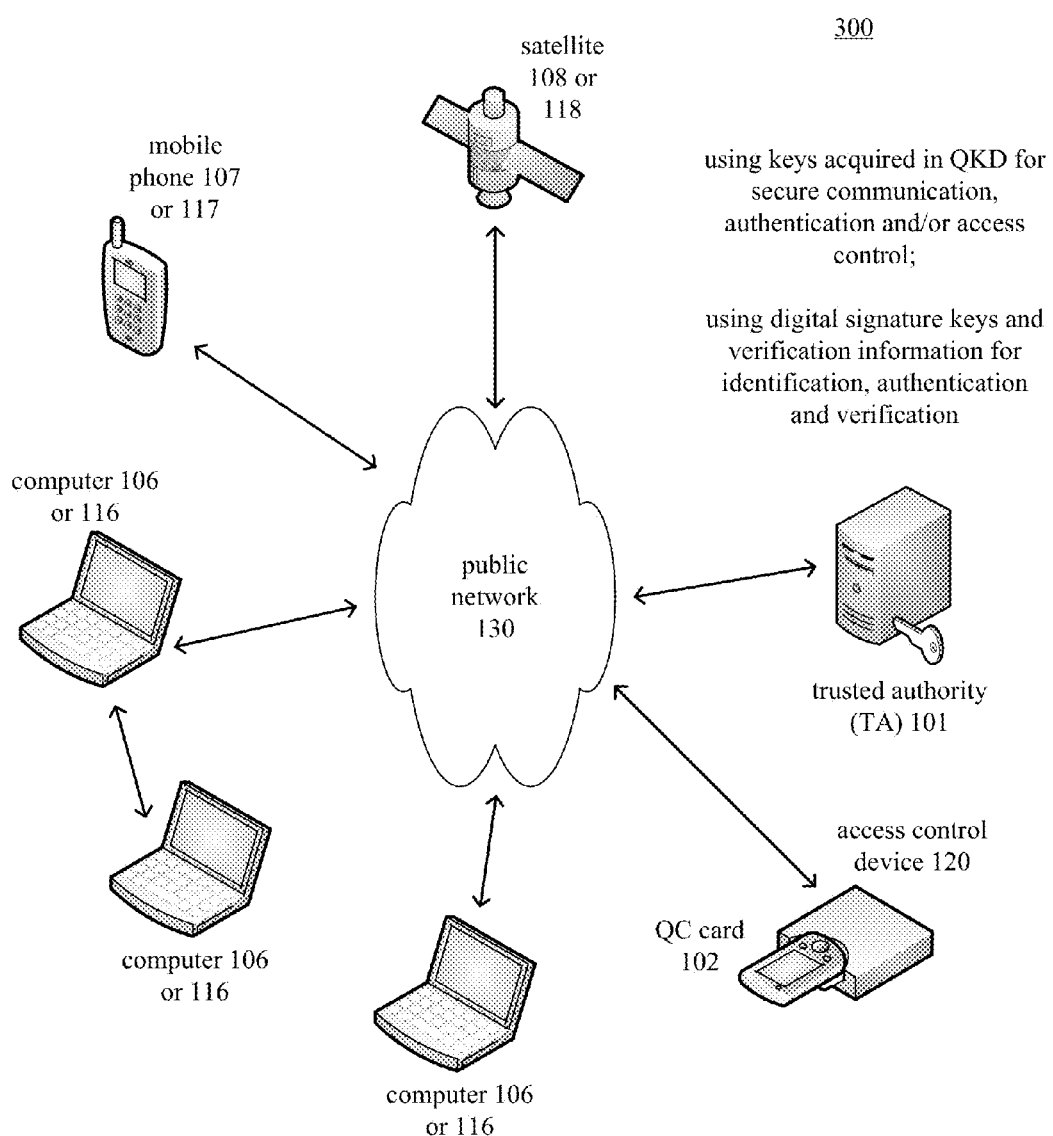

FIG. 3 shows an example operating environment (300) in which quantum keys distributed through QKD are used to establish secure communication, used for authentication or used for access control. With one or more quantum keys and information provided by the trusted authority (101), a user device can securely communicate with another user device directly or over a public network (130) such as the Internet. Or, the user device can use a quantum key to authenticate itself to another user device or gain access to a facility through an access control device (120). Within the network of user devices that have each received quantum keys from QKD with the trusted authority, one user device can establish a secure connection with any other user device without QKD between the two user devices.

The trusted authority (101) can use one of its previously generated digital signature keys to sign a message to a user device, which can in turn use previously received verification information to verify the identity of the trusted authority (101). A user device can use one of its previously generated digital signature keys to sign a message to another user device. The other user device can use previously received verification information to verify the identity of the first user device, or it can request such verification information from the trusted authority (101). In this role, the trusted authority (101) can verify the credentials of a user at various stages before distributing information regarding the user, to verify that credentials for the user have not been revoked.

A user device shown in FIG. 3 can acquire its quantum keys through any form of QKD with the trusted authority (101). Some of the user devices shown in FIG. 3 acquired quantum keys directly through QKD with the trusted authority (101), as illustrated in FIG. 1. For example, the mobile phone (107) and QC card (102) acquired quantum keys from QKD with the trusted authority. The user computers (106) acquired quantum keys directly from a local connection to a conventional QC transmitter in QKD with the trusted authority. Other user devices shown in FIG. 3 acquired quantum keys from a QC card, as shown in FIG. 2. For example, the satellite (118), mobile phone (117) and user computers (116) acquired quantum keys from a QC card (102). In any case, a user device can use its quantum keys at a location different than the location at which the quantum keys were distributed to the user device. Similarly, digital signature keys can be generated at a device or conveyed to the device, and verification information can be received at a device or conveyed to the device.

The trusted authority (101) is both a QC node (as in FIG. 1) and a conventional network contact point. Aside from QKD, acting in the role of a network server, the trusted authority (101) can exchange information using conventional network communication with a user device that acts in the role of a network client. In this way, the user device can receive information that is usable in combination with one of its stored quantum keys to establish a secure connection with another user device. Or, the user device can receive material from the trusted authority (101) that has been encrypted with one of its stored quantum keys. In addition to managing QKD, the trusted authority (101) can fill the role of certificate authority (e.g., generally to provide functions of a certificate directory) and registration authority in a PKI. Alternatively, another system fills the role of certificate authority and/or registration authority.

Quantum keys can facilitate secure communication even when the quantum keys are not used for algorithmic encryption. If two user devices have the same quantum keys, a first user device can use stored quantum keys to determine patterns to spread information content between wavelengths and/or time slots of a signal, then spread the information according to the patterns in transmission. The second user device determines the patterns from the stored quantum keys and de-spreads the information content from the signal it receives. The patterns depend on the stored quantum keys, but security is provided at the physical layer in transmission, not through use of the stored quantum keys in encryption.

When the quantum keys are used, the trusted authority (101) can be online or offline. For example, suppose two devices have each acquired quantum keys from QKD with the trusted authority (101). To establish a secure connection with a second user device, a first user device contacts the trusted authority (101) over a public network (130) such as the Internet. The first user device receives information from the trusted authority (101) that can be used, with a quantum key at the first user device, to establish a secure connection with the second user device. The first and second user devices can then use a joint session key for secure communication over the public network (130) or otherwise. When information from an online trusted authority (101) is needed to set up communication, an online trusted authority (101) can verify the credentials of a user before providing information about the user, so as to prevent secure communication from taking place when credentials for the user have been revoked.

Or, the trusted authority (101) can provide such information to the first user device and/or second user device, then go offline. Even though the trusted authority is offline, the first and second user devices can subsequently establish a secure connection over the public network (130) or directly with each other. In this case, however, the trusted authority (101) no longer provides verification of credentials.

In general, the information that the trusted authority (101) provides for use with the quantum keys can be provided in a non-secret way over the public network (130), since the information is only useful to the possessor of a quantum key. Section IV describes example protocols for secure multi-party communication. The example protocols can be used for secure communication, authentication, access control, and other applications in operating environments such as the example environment (300) of FIG. 3.

II. Example Mobile Devices with QC Card.

Figure 4:
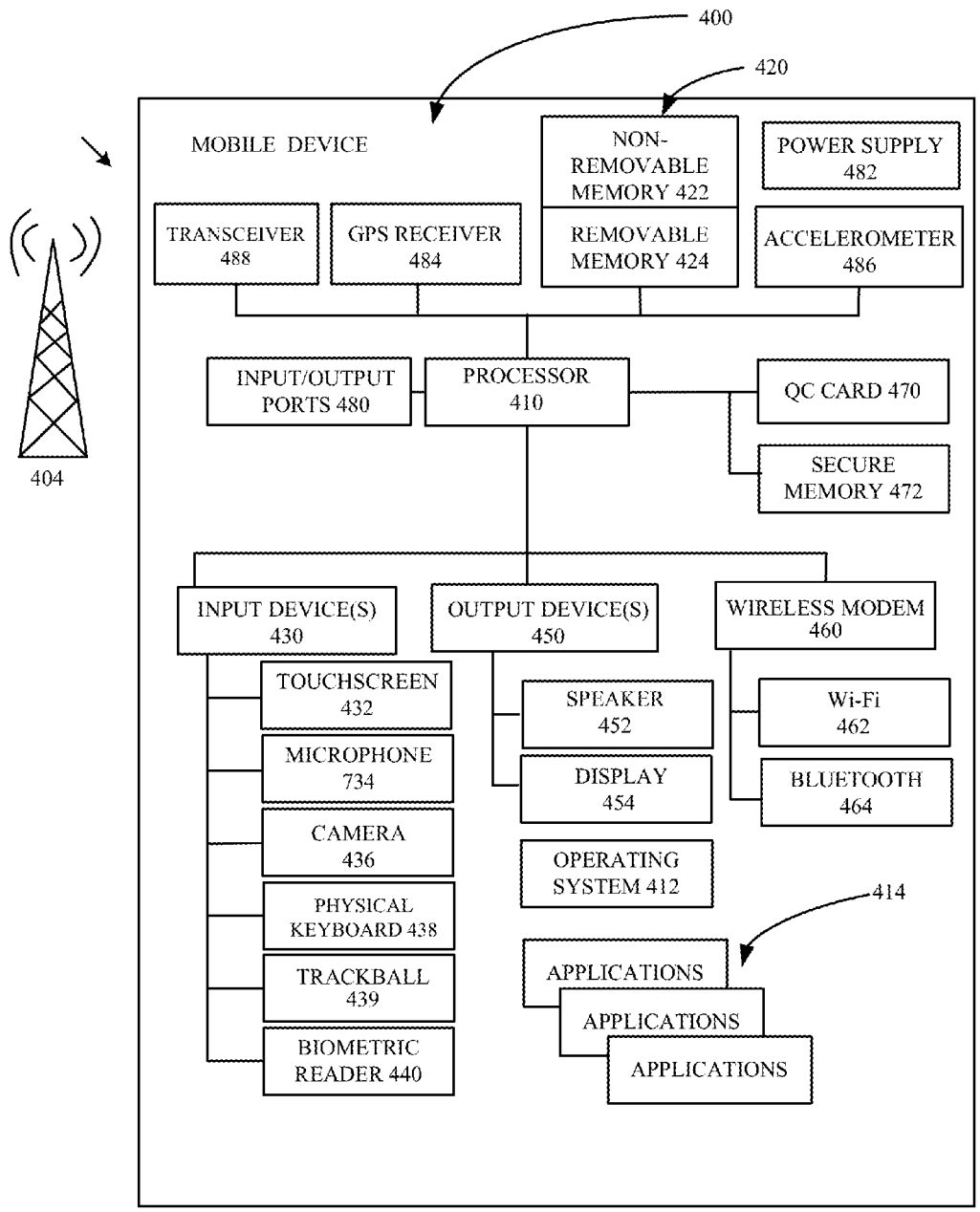
FIG. 4 is a block diagram of a mobile device that incorporates a QC card in some embodiments.

FIG. 4 is a system diagram depicting an exemplary mobile device (400) including a variety of optional hardware and software components, shown generally at (402). Any components (402) in the mobile device can communicate with any other component, although not all connections are shown, for ease of illustration. The mobile device can be any of a variety of computing devices (e.g., cell phone, smartphone, handheld computer, personal digital assistant, etc.) and can allow wireless two-way communications with one or more mobile communications networks (404), such as a cellular or satellite network.

In particular, the mobile device (400) includes a QC card (470) and secure memory (472) for storing quantum keys. The secure memory (472) can also store digital signature keys and/or verification information.

The illustrated mobile device can include a controller or processor (410) (e.g., signal processor, microprocessor, ASIC, or other control and processing logic circuitry) for performing such tasks as signal coding, data processing, input/output processing, power control, and/or other functions. An operating system (412) can control the allocation and usage of the components (402) and support for one or more application programs (414). The application programs can include common mobile computing applications (e.g., include email applications, calendars, contact managers, web browsers, messaging applications), or any other computing application. In some scenarios, an application program uses one or more of the quantum keys stored in the secure memory (472) to encrypt and/or decrypt information that is communicated with the mobile device (400). Or, an application program uses one or more digital signature keys to sign a message. Or, an application program uses verification information to verify the identity of an originator of a message.

The illustrated mobile device can include memory (420). Memory (420) can include non-removable memory (422) and/or removable memory (424). The non-removable memory (422) can include RAM, ROM, flash memory, a disk drive, or other well-known memory storage technologies. The removable memory (424) can include flash memory or a Subscriber Identity Module card, which is well known in GSM communication systems, or other well-known memory storage technologies. The memory (420) can be used for storing data and/or code for running the operating system (412) and the applications (414). Example data can include web pages, text, images, sound files, video data, or other data sets to be sent to and/or received from one or more network servers or other mobile devices via one or more wired or wireless networks.

The mobile device can support one or more input devices (430), such as a touch screen (432), microphone (434), camera (436), physical keyboard (438) and/or trackball (439) and one or more output devices (450), such as a speaker (452) and a display (454). The touch screen (432) and/or camera (436) can provide rudimentary functionality for a biometric reader, or the mobile device (400) can include a dedicated biometric reader (440). Other possible output devices (not shown) can include a piezoelectric or other haptic output device. Some devices can serve more than one input/output function. For example, touch screen (432) and display (454) can be combined in a single input/output device.

A wireless modem (460) can be coupled to an antenna (not shown) and can support two-way communications between the processor (410) and external devices. The modem (460) is shown generically and can include a cellular modem for communicating with the mobile communication network (404) and/or other radio-based modems (e.g., Bluetooth or \AR-Fi). The wireless modem (460) is typically configured for communication with one or more cellular networks, such as a GSM network for data and voice communications within a single cellular network, between cellular networks, or between the mobile device and a public switched telephone network.

The mobile device can further include at least one input/output port (480), a power supply (482), a satellite navigation system receiver (484) such as a global positioning system receiver, an accelerometer (486), a transceiver (488) (for wirelessly transmitting analog or digital signals) and/or a physical connector (490), which can be a USB port, IEEE 1394 (firewall) port, and/or RS-232 port. The illustrated components (402) are not required or all-inclusive, as components can be deleted and other components can be added. A quantum key stored in the secure memory (472) can be used to encrypt and/or decrypt information transmitted or received in non-quantum communication over a public channel using the modem (460), port (480), transceiver (488) or physical connector (490).

III. Example Computing Systems.

Figure 5:
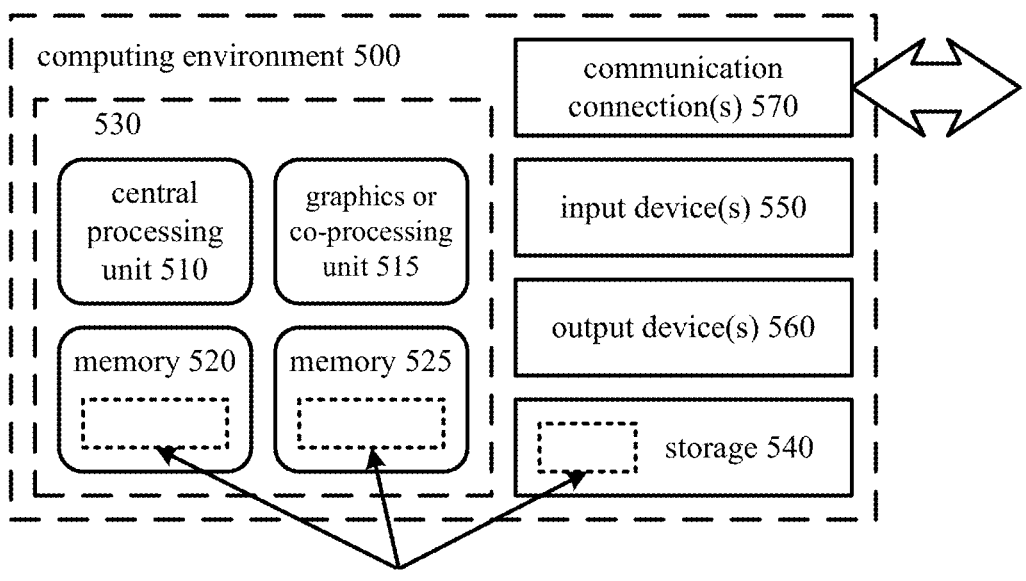
FIG. 5 is a block diagram of an example computing system in which some described embodiments can be implemented.

FIG. 5 illustrates a generalized example of a suitable computing system (500) in which several of the described innovations may be implemented. The computing system (500) is not intended to suggest any limitation as to scope of use or functionality, as the innovations may be implemented in diverse general-purpose or special-purpose computing systems. The computing system (500) can implement a trusted authority, certificate authority and/or registration authority that provides a feature of the QKM innovations described herein. Or, the computing system (500) can implement a feature of the QKM innovations described herein in the role of a user device.

With reference to FIG. 5, the computing system (500) includes one or more processing units (510, 515) and memory (520, 525). In FIG. 5, this most basic configuration (530) is included within a dashed line. The processing units (510, 515) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 5 shows a central processing unit (510) as well as a graphics processing unit or co-processing unit (515). The tangible memory (520, 525) may be volatile memory (e.g., registers, cache, RAM), non-volatile memory (e.g., ROM, EEPROM, flash memory, etc.), or some combination of the two, accessible by the processing unit(s). The memory (520, 525) stores software (580) implementing one or more innovations for QKM, in the form of computer-executable instructions suitable for execution by the processing unit(s).

A computing system may have additional features. For example, the computing system (500) includes storage (540), one or more input devices (550), one or more output devices (560), and one or more communication connections (570). An interconnection mechanism (not shown) such as a bus, controller, or network interconnects the components of the computing system (500). Typically, operating system software (not shown) provides an operating environment for other software executing in the computing system (500), and coordinates activities of the components of the computing system (500).

The tangible storage (540) may be removable or non-removable, and includes magnetic disks, magnetic tapes or cassettes, CD-ROMs, DVDs, or any other medium which can be used to store information in a non-transitory way and which can be accessed within the computing system (500). The storage (540) stores instructions for the software (580) implementing one or more innovations for QKM.

The input device(s) (550) may be a touch input device such as a keyboard, mouse, pen, or trackball, a voice input device, a scanning device, camera, or another device that provides input to the computing system (500). The output device(s) (560) may be a display, printer, speaker, CD-writer, or another device that provides output from the computing system (500).

The communication connection(s) (570) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (500), computer-readable media include memory (520, 525), storage (540), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

IV. Secure Multi-Party Communication After Quantum Key Distribution.

Section IV describes protocols for secure multi-party communication after QKD. The QKM innovations, as described in Section V, provide various extensions and variations of the protocols for secure multi-party communication.

Establishing shared secret session keys is a primary objective of secure communications. Use of the shared secret session keys enables users to achieve confidentiality and verify authenticity for their messages. Multiple protocols (e.g., Needham-Schroeder and Shoup-Rubin; key transport based on symmetric encryption; key agreement based on symmetric techniques) provide ways to establish shared secret session keys for a secure communications network of N users. In such protocols, each user has a secret pre-placed long-term key that is shared with a trusted authority. Pairs of users derive key encryption keys algorithmically from their long-term keys through additional communication with the trusted authority. The key encryption keys are then used to establish secret session keys between pairs of users.

Secure distribution of long term keys can be problematic. In practice, long-term keys can be distributed out-of-band, by courier, or by having each user bring his or her device into physical proximity of the trusted authority for direct delivery of the long-term key. Such methods of distributing long-term keys are cumbersome and susceptible to compromise. Alternatively, public key cryptography could be used for distribution of long-term keys, but public key cryptography is susceptible to archival attack.

Moreover, aside from distribution of long-term keys, because key encryption keys are derived algorithmically from long term keys, these protocols lack forward security. If a long-term key is compromised, or if the cryptographic algorithm used to derive key encryption keys from long-term keys is broken, the secrecy of subsequent keys is not assured since the subsequent keys can be predicted from known previous keys.

Protocols described below use QKD to provide keys to users. Pre-placement of long-term keys out-of-band, by courier, by public key cryptography or by delivery in close physical proximity is not required. Instead, each user has a pre-placed short-term authentication key that is shared with the trusted authority. The short-term authentication key is used to authenticate the user in the first QKD session between the user and the trusted authority. After the first QKD session has been completed, the short-term authentication key need no longer be kept secret—it can be replaced with a small portion of the shared secret bits produced in the first QKD session to form a new authentication key. The new authentication key is used for authentication of the user at the beginning of the next QKD session, replaced with another authentication key, and so on.

The rest of the shared secret bits produced in QKD sessions take the roles of long-term keys and key encryption keys in the conventional protocols. These keys are termed encryption keys, and the encryption keys can be used to create secure session keys for encryption/decryption of messages between users. The encryption keys have no algorithmic heritage from the authentication keys, since the encryption keys are randomly produced bits. Through additional, on-demand QKD sessions, the encryption keys can be frequently and flexibly updated with strong forward security. Moreover, the QCs in QKD sessions are not susceptible to passive monitoring or tapping, so the encryption keys and the fresh authentication keys are immune to archival attack.

In summary, compared to conventional protocols, users need not protect long-term secret keys since fresh authentication keys are generated in QKD. Encryption keys (and shared session keys exchanged using encryption keys) can be frequently replaced with strong forward security. Due to the strong forward security and increased turnover in use/replacement of authentication keys and encryption keys, the volume of data at risk to security breaches is much reduced when compared to data at risk from compromise of a long-term key or key-encryption key in the conventional protocols.

The described techniques and tools for secure multi-party communication after QKD can be performed with user devices that include QC cards and/or with user devices that receive keys from QC cards. In addition, the described techniques and tools can be performed with other user devices, e.g., devices that acquire keys through conventional QKD with a trusted authority.

A. Example Protocols for QKD Between Trusted Authority and Users

FIG. 6 illustrates a generalized example protocol (600) including QKD between a trusted authority and one or more user devices to establish keys for secure multi-party communication. Through the protocol (600), each of multiple users performs QKD (e.g., point-to-point QKD or other QKD) with a trusted authority to establish keys with forward secrecy. The trusted authority also provides each user with a non-secret look-up table from which the keys of other users can be derived. User-to-user QKD is not required, yet many of the benefits and advantages of QKD are retained in user-to-user communication.

FIG. 6 details operations between a first user device ("user device 1") and the trusted authority. The authentication and QKD operations are repeated between the trusted authority and each of N user devices i, for $1 \leq i \leq N$. Alternatively, the trusted authority establishes keys with a device that acts as a fillgun, eventually distributing the keys to a user device for secure multi-party communication with one or more other user devices. Without loss of generality, for the sake of presentation, the operations of the protocol (600) are described with reference to a user device.

The first user device receives biometric indicia B for the user. For example, the biometric indicia are fingerprint scan data. Instead of or in addition to the biometric indicia, the user device can accept and encrypt keystroke input for a personal identification number.

The first user device encrypts the biometric indicia B using an encryption algorithm E[a; b]. For example, the first user device uses a short pre-placed authentication key $AK_0(1)$ for the first session of QKD with the trusted authority. The encryption algorithm E[a; b] can be a symmetric key encryption algorithm of information a with key b, such as AES (see FIPS 197 "The Advanced Encryption Standard (AES)") or another encryption algorithm. Generally, the encrypted authentication information is sent over a non-secure network such as a public network.

The trusted authority receives the encrypted authentication information and decrypts it using the appropriate algorithm (e.g., symmetric key encryption algorithm) and pre-placed authentication key $AK_0(1)$ of the first user device. The trusted authority compares the received authentication information with previously provided identification information for the first user and, if appropriate, authenticates the user. Alternatively (not shown in FIG. 6), the first user device and trusted authority can engage in authentication using a quantum identification protocol ("QIP") as described in section IV.F.

Assuming the user has been authenticated, the first user device and trusted authority perform QKD to generate a secret random bit sequence that is parsed into keys. For example, the user device and trusted authority generate N−1 secret independent encryption keys and N−1 secret independent key derivation keys, which are shared by the user device and the trusted authority, and which are stored in secure memory at trusted authority and user device. In example implementations, the shared bit series is parsed into the following keys by both the trusted authority and user device i:

N−1 encryption keys K(i, j) for $j \neq i$,
N−1 key derivation keys L(i, j) for $j \neq i$,
a key authentication key M(i) and
a fresh authentication key $AK_x(i)$.

The encryption keys K(i, j), key derivation keys L(i, j), and key authentication key M(i) can have 256 bits per key or some other number of bits per key. FIG. 6 shows distribution of shared encryption keys K(1, j), derivation keys L(1, j), a key authentication key M(1) and a fresh authentication key $AK_1(1)$ for the first user device. The encryption keys K(1, j), key derivation keys L(1, j) and key authentication key M(1) are used as described below. The initial authentication key $AK_0(1)$ of the first user device no longer needs to be kept secret. It is replaced with a fresh authentication key $AK_1(1)$ produced in the QKD, for use in authenticating the user in a future QKD session with the trusted authority.

In contrast to conventional approaches that require placement of long-term keys out-of-band, by courier or by close physical proximity, starting from a short pre-placed secret authentication key $AK_0(i)$, QKD provides an essentially unconstrained ability to generate new secret bit strings shared by the trusted authority and user i. In addition, the new secret bit strings for K(i, j), L(i, j), M(i) and $AK_x(i)$ have no algorithmic dependence on the pre-placed authentication key $AK_0(i)$.

According to the protocol (600) shown in FIG. 6, the trusted authority repeats the authentication and QKD for each of one or more other user devices. Thus, using his or her pre-placed authentication key $AK_0(i)$, each user i, for $1 \leq i \leq N$, establishes a QKD session with the trusted authority and establishes shared keys with the trusted authority.

Following QKD with the N user devices, the trusted authority stores the encryption keys K(i, j), key derivation keys L(i, j), and key authentication key M(i) for the N user devices, and each of the N user devices i stores the encryption keys K(i, j), key derivation keys L(i, j), and key authentication key M(i) for that user device i. Typically, the keys are stored in secure memory. For example, if there are five user devices, the trusted authority stores encryption keys and key derivation keys as follows.

| K(i, j) | i = 1 | i = 2 | i = 3 | i = 4 | i = 5 |
|---|---|---|---|---|---|
| j = 1 | — | $k_{2,1}$ | $k_{3,1}$ | $k_{4,1}$ | $k_{5,1}$ |
| j = 2 | $k_{1,2}$ | — | $k_{3,2}$ | $k_{4,2}$ | $k_{5,2}$ |
| j = 3 | $k_{1,3}$ | $k_{2,3}$ | — | $k_{4,3}$ | $k_{5,3}$ |
| j = 4 | $k_{1,4}$ | $k_{2,4}$ | $k_{3,4}$ | — | $k_{5,4}$ |
| j = 5 | $k_{1,5}$ | $k_{2,5}$ | $k_{3,5}$ | $k_{4,5}$ | — |

| L(i, j) | i = 1 | i = 2 | i = 3 | i = 4 | i = 5 |
|---|---|---|---|---|---|
| j = 1 | — | $l_{2,1}$ | $l_{3,1}$ | $l_{4,1}$ | $l_{5,1}$ |
| j = 2 | $l_{1,2}$ | — | $l_{3,2}$ | $l_{4,2}$ | $l_{5,2}$ |
| j = 3 | $l_{1,3}$ | $l_{2,3}$ | — | $l_{4,3}$ | $l_{5,3}$ |
| j = 4 | $l_{1,4}$ | $l_{2,4}$ | $l_{3,4}$ | — | $l_{5,4}$ |
| j = 5 | $l_{1,5}$ | $l_{2,5}$ | $l_{3,5}$ | $l_{4,5}$ | — |

And each user device i stores the encryption keys and key derivation keys from one of the columns of the tables.

Returning to FIG. 6, the trusted authority determines pair keys P(i, j) and key authentication values A(i, j). Each of the pair keys and each of the key authentication values is specific to pair-wise communication between a user device i and user device j. In the example implementations, the trusted authority computes the keys P(i, j) and key authentication values A(i, j) as follows:

$$P(i,j)=L(i,j) \oplus K(j,i) \text{ for } 1 \leq i, j \leq N, \text{ and } i \neq j,$$

$$A(i,j)=H[K(j,i); M(i)] \text{ for } 1 \leq i, j \leq N, \text{ and } i \neq j,$$

where $\oplus$ indicates a bitwise XOR operation, and H[a; b] indicates a keyed hash function of input a with key b. For example, the keyed hash function H[a; b] is a keyed cryptographic hash function such as HMAC-SHA-256 (see FIPS 198 "The Keyed-Hash Message Authentication Code (HMAC)") or other keyed hash function. Alternatively, the hash function H[ ] is another type of hash function that is not a keyed hash function. The pair keys and key authentication values can each have 256 bits or some other number of bits. The trusted authority can organize the pair keys and key authentication values as two look-up tables or with other data structures. For example, if there are five user devices, the trusted authority determines pair keys and key authentication values as follows from the encryption keys and key derivation keys shown above.

| P(i, j) | i = 1 | i = 2 | i = 3 | i = 4 | i = 5 |
|---|---|---|---|---|---|
| j = 1 | — | $l_{2,1} \oplus k_{1,2}$ | $l_{3,1} \oplus k_{1,3}$ | $l_{4,1} \oplus k_{1,4}$ | $l_{5,1} \oplus k_{1,5}$ |
| j = 2 | $l_{1,2} \oplus k_{2,1}$ | — | $l_{3,2} \oplus k_{2,3}$ | $l_{4,2} \oplus k_{2,4}$ | $l_{5,2} \oplus k_{2,5}$ |
| j = 3 | $l_{1,3} \oplus k_{3,1}$ | $l_{2,3} \oplus k_{3,2}$ | — | $l_{4,3} \oplus k_{3,4}$ | $l_{5,3} \oplus k_{3,5}$ |
| j = 4 | $l_{1,4} \oplus k_{4,1}$ | $l_{2,4} \oplus k_{4,2}$ | $l_{3,4} \oplus k_{4,3}$ | — | $l_{5,4} \oplus k_{4,5}$ |
| j = 5 | $l_{1,5} \oplus k_{5,1}$ | $l_{2,5} \oplus k_{5,2}$ | $l_{3,5} \oplus k_{5,3}$ | $l_{4,5} \oplus k_{5,4}$ | — |

| A(i, j) | i = 1 | i = 2 | i = 3 | i = 4 | i = 5 |
|---|---|---|---|---|---|
| j = 1 | — | $H[k_{1,2}; M(2)]$ | $H[k_{1,3}; M(3)]$ | $H[k_{1,4}; M(4)]$ | $H[k_{1,5}; M(5)]$ |
| j = 2 | $H[k_{2,1}; M(1)]$ | — | $H[k_{2,3}; M(3)]$ | $H[k_{2,4}; M(4)]$ | $H[k_{2,5}; M(5)]$ |
| j = 3 | $H[k_{3,1}; M(1)]$ | $H[k_{3,2}; M(2)]$ | — | $H[k_{3,4}; M(4)]$ | $H[k_{3,5}; M(5)]$ |
| j = 4 | $H[k_{4,1}; M(1)]$ | $H[k_{4,2}; M(2)]$ | $H[k_{4,3}; M(3)]$ | — | $H[k_{4,5}; M(5)]$ |
| j = 5 | $H[k_{5,1}; M(1)]$ | $H[k_{5,2}; M(2)]$ | $H[k_{5,3}; M(3)]$ | $H[k_{5,4}; M(4)]$ | — |

The pair keys P(i, j) and key authentication values A(i, j) need not be kept secret. Generally, the trusted authority makes the pair keys P(i, j) and key authentication values A(i, j) available for distribution to the respective user devices over a non-secure network such as a public network. A given user device i retrieves the pair keys P(i, j) and key authentication values A(i, j) that it uses. For example, the first user device of FIG. 6 retrieves the pair keys P(1, j) and key authentication values A(1, j) specific to the first user device. The user devices can retrieve and store the pair keys and key authentication values for use during later communication between user devices even if the trusted authority is offline. Or, if the trusted authority is online during later communication between user devices, a user device i can retrieve the pair keys and key authentication values for the device i at the time of communication, or it can retrieve only the key and authentication value specific to communication from user device i to user device j from the online trusted authority.

As explained below, from his key derivation key L(i, j) and from a pair key P(i, j) provided by the trusted authority, a user device i can derive the encryption key K(j, i) that it uses for communication to another user device j. From his key authentication key M(i) and the key authentication value A(i, j) provided by the trusted authority, the user device i can verify that the encryption key K(j, i) is authentic. The user device j can similarly derive and authenticate the encryption key K(i, j) for communicating to the user device i. Using one or both of the encryption keys, the two user devices can establish one or more shared secret session keys for communications between them.

Because the encryption keys and key derivation keys are generated by QKD, they are independent and do not depend on any pre-placed secret. As such, the protocol (600) shown in FIG. 6 provides strong forward security that is superior to conventional protocols for multi-party communication. Furthermore, fresh encryption keys and key derivation keys can be generated in future QKD sessions between user devices and the trusted authority. Moreover, additional users can be added to the communication network by the trusted authority. For this purpose, the trusted authority can assign extra encryption keys and key derivation keys for a given user device i for use with to-be-determined new user devices, distribute encryption keys and key derivation keys by QKD with a new user device when the new user device is added, and update the pair keys and key authentication values for distribution.

B. Example Protocols for Secure Communication Between Users

In the example implementations, for a user device i to establish secure communication with a user device j, the user device i uses its key derivation key L(i, j) and the pair key P(i, j) to derive the encryption key K(j, i) of the user device j. The user device i computes the encryption key K(j, i) as follows.

$$K(j,i)=L(i,j) \oplus P(i,j).$$

For example, suppose the first user device (i=1) tries to establish secure communication with a fourth user device (i=4). The first user device derives the encryption key K(4, 1) from the key derivation key L(1, 4) and the pair key P(1, 4). With the example keys shown in the tables above, the key derivation key L(1, 4) is $l_{1,4}$, and the pair key P(1, 4) is $l_{1,4} \oplus k_{4,1}$. The first user device computes the encryption key K(4, 1) as follows.

$$K(4,1)=l_{1,4} \oplus (l_{1,4} \oplus k_{4,1}).$$

The result of the operation is $k_{4,1}$, which is K(4, 1).

The user device i can authenticate the encryption key K(j, i) derived for the user device j. For example, the user device i computes a check value from its key authentication key M(1) and the encryption key K(j, i):

$$\text{check\_value} = H[K(j,i); M(i)]$$

where H[a; b] indicates the keyed hash function also used by the trusted authority. The user device i then matches the check value against the reference authentication value A(i, j) provided by the trusted authority to the user device i. If the values match, the encryption key K(j, i) is authentic. For example, for the first user device (i=1) to authenticate the encryption key K(4, 1), the first device computes the check value H[K(4,1); M(1)]. With the example keys shown in the tables above, the key encryption key K(4, 1) is $k_{4,1}$, and the key authentication value A(1, 4) is H[$k_{4,1}$; M(1)]. The first user device computes check_value=H[$k_{4,1}$; M(1)] and compares the check value to the reference value A(1,4).

The user devices i and j then use one or more of the encryption keys for secure communication between the user devices i and j. Typically, the secure communication happens over a non-secure network such as a public network. FIGS. 7a and 7b illustrate two alternative modes of operation for user devices i and j to use encryption keys. In FIGS. 7a and 7b, the two user devices are a first user device (i=1) and fourth user device (i=4)

FIG. 7a shows how two user devices use encryption keys to establish secure communication according to a first mode of operation (700). In the first mode of operation (700), the first user device derives and authenticates the encryption key K(4,1) of the fourth user device. The fourth user device similarly derives and authenticates the encryption key K(1, 4) of the first user device. More generally, user device i derives and authenticates the encryption key K(j, i) of user device j, and user device j derives and authenticates the encryption key K(i, j) of user device i.

In FIG. 7a, the first user device uses the encryption key K(4,1) to encrypt messages to the fourth user device, which uses the encryption key K(4,1) to decrypt the messages. The fourth user device uses the encryption key K(1,4) to encrypt messages to the first user device, which uses the encryption key K(1,4) to decrypt the messages. Alternatively, the roles of the encryption keys are swapped between the first user device and fourth user device (i.e., the first user device uses the key K(1,4) for encryption of outgoing messages, and the fourth user device uses the key K(4,1) for encryption of outgoing messages). Different keys are still used when sending a message to a user device and receiving a message from that user device. As another alternative, both user devices use only one of the encryption keys for both encryption and decryption (e.g., the first user device and fourth user device use only the encryption key K(4,1)), which means the fourth user device need not derive the encryption key K(1,4)), although this alternative with bi-directional communication using one key is less secure, e.g., when one of the users is compromised. The encryption key used can depend on which user device initiates the communication session. In any case, in the first mode of operation (700), the user devices directly use one or more encryption keys as session key(s) to encrypt/decrypt messages.

The first user device and fourth user device use an encryption algorithm E[a; b], which can be a symmetric key encryption algorithm such as AES or other encryption algorithm. The encryption algorithm can be the same as the encryption algorithm used to exchange authentication information before QKD, or it can be a different encryption algorithm.

One issue with the first mode of operation (700) is reuse of the encryption keys K(i, j) in different sessions between the user devices i and j. (Reuse of the encryption keys K(i, j) makes the communication susceptible to conventional attacks on the encryption algorithm E[a; b].) To address this issue, if the trusted authority is online (such as in a transparent fiber network), before each communication session the user devices i and j can generate new encryption keys and key derivation keys with forward security. This reduces the amount of data encrypted with any given key.

On the other hand, if the trusted authority is offline (such as when one of the user devices is a satellite, or when keys are provided from the trusted authority to a QC card), the encryption keys and key derivation keys can be replaced less frequently. Thus, rather than distributing a single key K(i, j) and single key L(i, j) specific to user devices i and j in a given QKD session, the trusted authority distributes multiple encryption keys key K(i, j) and multiple encryption keys L(i, j) specific to user devices i and j. For example, the first user device of FIG. 7a receives multiple encryption keys K(1,4), multiple key derivation keys L(1,4), and multiple corresponding pair keys P(1,4). The multiple keys can be used for multiple different communication sessions between the user devices i and j, or they can be used according to an established pattern within a single communication session (e.g., use for x minutes or x bytes of information). Again, this reduces the amount of data encrypted with any given key.

FIG. 7b shows how two user devices use encryption keys to establish secure communication according to a second mode of operation (750). In FIG. 7b, the first user device initiates the communication session. The first user device derives and authenticates the encryption key K(4,1) of the fourth user device. The first user device generates a session key S(1,4) and encrypts the session key S(1,4) using the derived encryption key K(4,1) of the fourth user device. More generally, user device i derives and authenticates the encryption key K(j, i) of user device j, generates a session key S(i, j), and encrypts the session key S(i, j) using the encryption key K(j, i) of user device j:

$$E[S(i,j); K(j,i)].$$

The encryption algorithm E[a; b] can be a symmetric key encryption algorithm such as AES or other encryption algorithm. The encryption algorithm can be the same as the encryption algorithm used to exchange authentication information before QKD, or it can be a different encryption algorithm.

The user device j receives the encrypted session key and decrypts it using the encryption key K(j, i), with the assurance that the session key came from user device i using the encryption key K(j, i) of user device j. In FIG. 7b, the fourth user device receives the encrypted session key E[S(1,4); K(4,1)] and decrypts it using the encryption key K(4,1). Alternatively, the user device j initiates the communication, and the roles of the user device i and user device j are switched in the second mode of operation (750). Or, the user device i that initiates the communication session uses its encryption key K(i, j) to encrypt the session key, and the other user device j derives the key K(i, j) to recover the session key.

In any case, the two user devices i and j use a shared session key to encrypt and decrypt message in secure communication between the two user devices. In FIG. 7b, the first user device and fourth user device use the session key S(1,4) to encrypt and decrypt messages between the two user devices. For a future communication session, or to switch the session key after a defined period in the first communication session, the two user devices i and j can establish a new shared session key. Relative to the first mode of operation (700), the second mode of operation (750) greatly reduces the amount of data encrypted with a given encryption key, since only session keys are encrypted. As such, the second mode of operation (750) is useful in scenarios in which user devices cannot frequently perform QKD with the trusted authority to replace their encryption keys and key derivation keys. In contrast to the first mode of operation (700), however, if an encryption key becomes compromised, the security of multiple sessions (instead of just a single session) is hurt. Further, management of the session keys in this mode resides with the user device that initiates a session, rather than the trusted authority.

C. Generalized Techniques for Secure Multi-Party Communication with QKD

Figure 8:
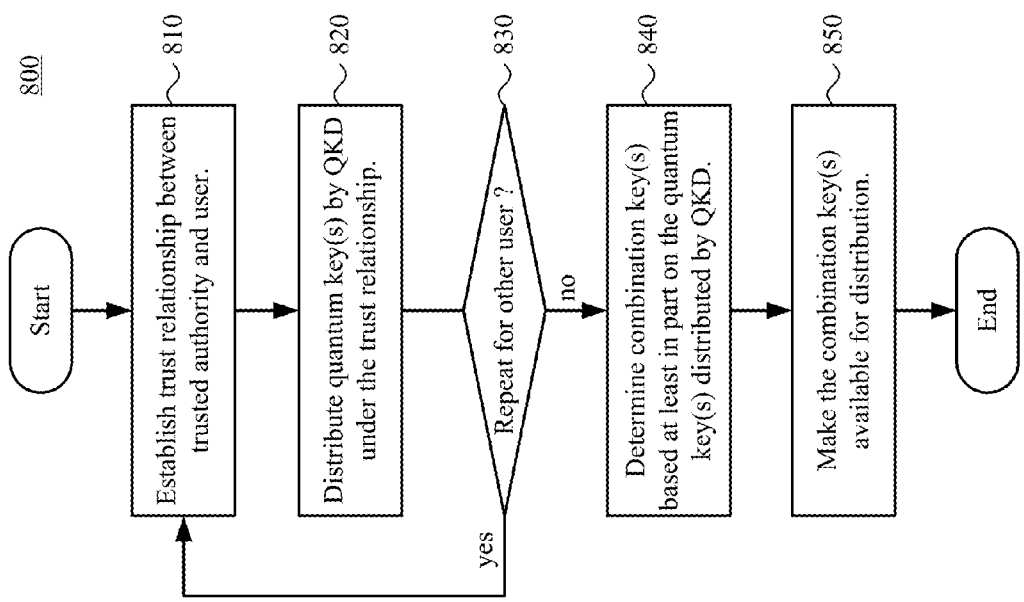
FIG. 8 is a flowchart illustrating a generalized technique for key distribution including QKD between a trusted authority and one or more user devices for secure multi-party communication.

FIG. 8 shows a generalized technique (800) for key distribution between a trusted authority and one or more user devices to distribute keys for secure multi-party communication. A computing system that implements a trusted authority performs the technique (800).

The trusted authority establishes (810) a trust relationship between the trusted authority and a user. For example, the trusted authority authenticates the user using biometric indicia and/or personal identification information (e.g., a PIN) provided by the user to establish the trust relationship. In some implementations, the biometric indicia and/or personal identification information are encrypted before transmission to the trusted authority over a public channel. The encryption uses a previously placed secret key, which can be replaced with another secret key from the results of QKD, for use in authentication before a subsequent QKD session. Alternatively, the trusted authority establishes the trust relationship using another mechanism.

After the trust relationship is established, the trusted authority distributes (820) one or more quantum keys by QKD under the trust relationship between the trusted authority and user. In this QKD, the quantum key(s) can be directly provided to a user device of the user. Or, the quantum key(s) can be provided to a fillgun device that subsequently provides the quantum key(s) to a user device of the user. Quantum keys distributed by QKD are randomly generated and, therefore, assumed to be different from user to user. Each quantum key is, in literal terms, a series of binary values. The definitions of the quantum keys depend on the scenario in which the quantum keys are used. Example scenarios are discussed below.

The trusted authority (830) determines whether to repeat these acts for QKD for another user and, if so, continues by establishing (810) a trust relationship with another user. In this way, the trusted authority distributes different quantum keys for use by users (user devices) in secure multi-party communication.

Subsequently, the trusted authority determines (840) one or more combination keys based at least in part on the quantum keys distributed by the trusted authority. In particular, the trusted authority determines a combination key from a quantum key distributed for a first user (first user device) and a quantum key distributed for a second user (second user device), where the combination key is adapted for communication between the first user device and the second user device. For example, the first user device can use the combination key, in combination with the quantum key distributed for the first user device, to determine the quantum key distributed for the second user device. A combination key is, in literal terms, a series of binary values. The definition of the combination key depends on the scenario in which the combination key is generated and used. Example scenarios are discussed below.

The trusted authority makes the combination key(s) available (850) for distribution to the user devices. In this way, the trusted authority facilitates secure communication between the respective users, even in the absence of QKD directly between the user devices. The ways that combination keys are organized and delivered depends on implementation. For example, the combination keys are organized as a look-up table that is made available for non-secret distribution over the Web or another public channel. Or, even though the combination keys need not be kept secret, some or all of the combination keys are provided to the respective user devices over a non-public channel. Alternatively, the combination keys are organized and/or delivered using another mechanism.

In some scenarios, a quantum key for a first user (first user device) is a key derivation key, and a quantum key for a second user (second user device) is an encryption key for the second user device. For example, in terms of the example protocols explained with reference to FIG. 6, the key derivation key is a key L(1, 2) for user device 1, and the encryption key is a key K(2, 1) for user device 2. The combination key is a pair key P(1, 2) computed as the bitwise XOR of L(1, 2) and K(2, 1). Alternatively, the combination key is determined using another mechanism. In general, for any two user devices, the role of the user device having the encryption key and the user device having the key derivation key can be switched to change which user device derives the encryption key of the other.

In other scenarios, the quantum keys for a first user (first user device) include a first key derivation key and an encryption key for the first device. The quantum keys for a second user (second user device) include a second key derivation key and an encryption key for the second user device. The trusted authority determines a first combination key from the first key derivation key and the encryption key for the second user device, and it determines a second combination key from the second key derivation key and the encryption key for the first device. For example, in terms of the example protocols explained with reference to FIG. 6, the first quantum keys include L(1, 2) and K(1, 2) for user device 1, and second quantum keys include L(2, 1) and K(2, 1) for user device 2. Pair key P(1, 2) is the bitwise XOR of L(1, 2) and K(2, 1), and pair key P(2, 1) is the bitwise XOR of L(2, 1) and K(1, 2). Alternatively, combination keys are determined using another mechanism. Thereafter, the first user device can determine the encryption key of the second user device from the first combination key and first key derivation key. Similarly, the second user device can determine the encryption key of the first user device from the second combination key and second key derivation key.

In any of these scenarios, the number of quantum keys distributed can be increased to accommodate communication with more users and user devices. The trusted authority can update the combination keys when more users are added to the network. The trusted authority can resupply users with new quantum keys as needed, updating combination keys accordingly.

In addition to determining and distributing combination keys, the trusted authority can distribute key authentication keys and key authentication values for authentication of user devices. For example, the quantum keys distributed for a user include a key authentication key for the user (user device). In terms of the example protocols explained with reference to FIG. 6, M(1) is an example of a key authentication key in the quantum keys for user device 1, and M(2)

is an example of a key authentication key in the quantum keys for user device 2. The trusted authority creates one or more key authentication values that are made available for distribution. For example, the trusted authority determines a key authentication value using a cryptographic hash function of a key authentication key for one user device and an encryption key for another user device. Alternatively, the key authentication value is created using another mechanism. Thereafter, the first user device can use its key authentication key and the key authentication value to check the value of an encryption key it has derived for the other user device.

Figure 9:
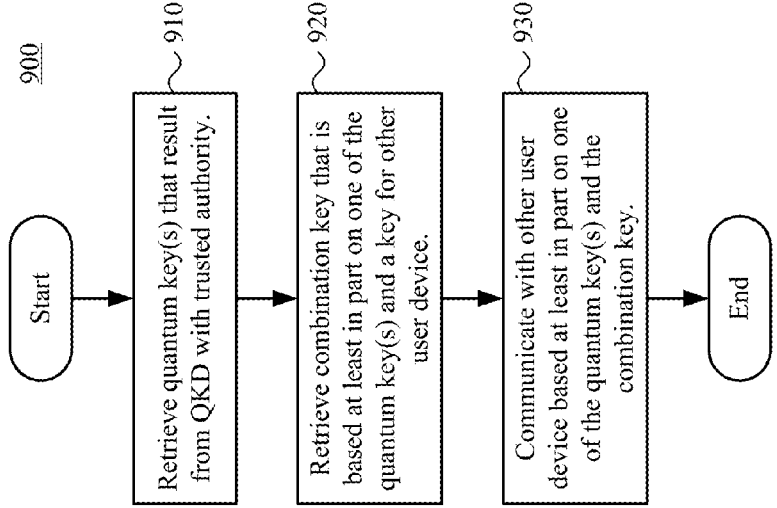
FIG. 9 is a flowchart illustrating a generalized technique for secure multi-party communication between user devices.

FIG. 9 shows a generalized technique (900) for secure multi-party communication between multiple user devices. A first user device retrieves (910) one or more quantum keys that resulted from QKD with a trusted authority under a trust relationship between the trusted authority and a user. For example, the first user device retrieves the quantum key(s) from secure memory or storage of the first user device. In some implementations, the quantum key(s) result from QKD between the trusted authority and the first user device itself. In other implementations, the quantum key(s) result from QKD between the trusted authority and a fillgun device, which subsequently provides the quantum key(s) to the first user device. The definitions of the quantum keys depend on the scenario in which the quantum keys are used. Example scenarios are discussed below.

Before QKD, a user device can provide information to the trusted authority to authenticate the user. For example, the user device receives biometric indicia and/or personal identification information (e.g., a PIN) provided by the user, encrypts the received material, and transmits the encrypted material to the trusted authority over a public channel. The encryption can use a previously placed secret key, which the user device replaces with another secret key from the results of QKD, for use in authentication before a subsequent QKD session. Alternatively, the user device uses another mechanism to establish a trust relationship with the trusted authority. In any case, the authentication and QKD can be completed long before a user device performs the technique (900) for secure communication.

Returning to FIG. 9, the first user device also retrieves (920) a combination key that is based at least in part on a retrieved quantum key and a key for another user device. For example, the first user device retrieves the combination key from storage of the user device or from a network resource over the Web or another public channel. The combination key can be provided from the trusted authority and stored at the first user device, or requested from an online trusted authority before communication. The ways that combination keys are organized and delivered depends on implementation, as explained above with reference to FIG. 8. The definition of the combination key depends on the scenario in which the combination key is generated and used. Example scenarios are discussed below.

The first user device then communicates (930) with the other user device based at least in part on the retrieved quantum key(s) and the combination key. In particular, the first user device derives the key of the other user device from the combination key and a retrieved quantum key, then uses the key of the other user device. The combination key thus facilitates secure communication between the two user devices even in the absence of QKD between the two user devices.

In some scenarios, a retrieved quantum key for the first user device is a key derivation key, and the first user device determines the key for the other device using the key derivation key and the combination key. For example, in terms of the example protocols explained with reference to FIGS. 7a and 7b, user device 1 determines an encryption key K(2, 1) for user device 2 as the bitwise XOR of the key derivation key L(1, 2) and the pair key P(1, 2). Alternatively, the first user device determines the key for the other device using another mechanism.

Having determined the key of the other user device, the first user device can generate a random session key, encrypt the session key using the determined key, and transmit the encrypted session key to the other user device. The other user device decrypts the session key, and the two user devices exchange messages encrypted using the session key. Alternatively, the other user device generates the session key, encrypts the session key using its key, and provides the encrypted session key to the first user device, which decrypts the session key using the derived key of the other user device. In general, for any two user devices, the role of the user device having the key derivation key and the other user device can be switched to change which user device derives the encryption key of the other user device.

In other scenarios, the quantum keys retrieved by the first user device include a key derivation key and an encryption key. In fact, each of the two user devices retrieves its own key derivation key and its own encryption key, then determines the encryption key of the other user device from the retrieved key derivation key and a combination key. Having determined the encryption key of the other user device in this way, each user device uses one of the two encryption keys to encrypt outbound messages to the other user device, and uses the other encryption key to decrypt inbound messages from the other user device.

In still other scenarios, the quantum keys retrieved by the first user device include a different key for each of multiple other user devices. The first user device determines a group session key, encrypts the group session key, and distributes the encrypted group session key to each of the other user devices. The following section describes example protocols for distribution of group session keys.

In some implementations, the quantum keys retrieved by the first user device also include a key authentication key. To authenticate the derived key of the other user device, the first user device retrieves a key authentication value made available by the trusted authority, which will be used for reference. The first user device determines its own version of the key authentication value from its key authentication key and the derived key of the other user device. For example, the first user device determines the key authentication value using a cryptographic hash function. Alternatively, the first user device determines the key authentication value using another mechanism. The first user device then compares the retrieved reference value to the newly determined value, to check that the values match.

D. Example Protocols for Group Keying

In some implementations, the above-described protocols for secure multi-party communication are extended to allow a group of users to establish a group session key using logical key hierarchy principles. For a group of N user devices, each of the N user devices gets keys from QKD with a trusted authority. One of the N user devices is designated group leader. The group leader generates a group key and derives the encryption key K(j, i) for each other member of the group (or, alternatively, uses its encryption key K(i, j) for the other member of the group). For each other member of the group, the group leader encrypts the group key using the appropriate encryption key and sends the encrypted group key to the other member. The other member decrypts the group key using its encryption key K(j, i) (or, alternatively, derives and uses the encryption key K(i, j) of the group leader). The members of the group then use the group key as a shared session key to encrypt and decrypt messages for secure communication within the group.

For example, suppose the group has ten members $I_1$ to $I_{10}$ that have each performed QKD with a trusted authority. To establish a common group key, one of the members (e.g., $I_{10}$) is designated group leader. The group leader $I_{10}$ generates a group key and derives the encryption keys K(j, $I_{10}$) for the other members of the group. The group leader encrypts the group key using the encryption keys for the other devices, respectively, and sends the encrypted versions of the group key to the other devices, which decrypt the group key for use in secure communication within the group.

For secure pair-wise communication between an individual group member and the group leader, the group leader can generate individual keys, one for each group member other than the leader. The group leader can encrypt these individual keys with the appropriate encryption keys K(j, i) (or, alternatively, K(i, j)) and deliver them to the other members along with the encrypted group key.

To simplify the process of distributing a new group key when a member leaves the group, the group leader can further divide the group members into sub-groups, generate sub-group keys for the respective sub-groups, and encrypt the appropriate sub-group key for delivery to each of the other members. For example, the group leader $I_{10}$ divides the remaining members $I_1$ to $I_9$ into three sub-groups: SG1={$I_1$, $I_2$, $I_3$}, SG2={$I_4$, $I_5$, $I_6$} and SG3={$I_7$, $I_8$, $I_9$}. The group leader $I_{10}$ generates three sub-group keys. For each of the other members, the group leader $I_{10}$ selects the appropriate sub-group key for the sub-group that includes the other member j, encrypts the sub-group key with the appropriate encryption key K(j, $I_{10}$) for the member j (or, alternatively, the key K($I_{10}$, j)), and delivers the encrypted sub-group key to the member j along with the group key or separately. The sub-group keys can also be used for communications within a sub-group that are secure relative to other sub-groups.

If member $I_1$ leaves the group, the remaining members get a new group key. Members $I_2$ and $I_3$ form a new sub-group SG1' and also get a new sub-group key. The group leader $I_{10}$ generates the new group key and generates the new sub-group key for the new sub-group SG1'. The group leader $I_{10}$ encrypts and sends the new group key and new sub-group key to each member of sub-group SG1', using the individual key appropriate for member $I_2$ and member $I_3$, respectively. The group leader $I_{10}$ also encrypts and sends the new group key to each member of sub-group SG2 and each member of sub-group SG3. For this, the group leader $I_{10}$ can use the individual key appropriate for the respective members $I_4$ to $I_9$ or use the appropriate sub-group key for SG2 or SG3. Alternatively, the group leader $I_{10}$ can provide the new group key to one member of each unchanged sub-group, who then conveys the new group key to other members of the sub-group using the sub-group key for encryption. By providing each user with three keys, the process of providing a new group key after departure of a group member can be accomplished more efficiently than sending a new group key to each user separately. After the new group and sub-group keys are in use, the former member $I_1$ is unable to participate in secure group and sub-group communications.

More elaborate variations of group re-keying involve more users and/or more layers of intermediate sub-grouping. For such variations, for example, the logical key hierarchy can be organized as nodes of a tree structure.

E. Performance Evaluation and Advantages of Protocols

Consider a scenario in which the trusted authority is expected to be offline during secure communication between user devices. If there are a thousand user devices (N=1000), each user device i stores N−1 encryption keys K(i, j), N−1 key derivation keys L(i, j), N−1 pair keys P(i, j), and N−1 key authentication values A(i, j) as well as a key authorization key M(i) and fresh authorization key $AK_x(i)$. If the keys and authentication values each have a length of 256 bits, the total requirements for memory are ((4×999)+2)×256=1023488 bits, or roughly 1 Mbit. A key or authentication value for a given user device j can be specified with 10 bits, since N<1024. The amount of quantum key material each user generates with the trusted authority for K(i, j) and L(i, j) is approximately 500 kbits. In a QKD system operating at a 10 MHz clock rate with secret bit rates~1 kbps, distributing the keys K(i, j) and L(i, j) takes about 500 seconds of QC (about 8 minutes) for each user.

The above-described secure multi-party communication after QKD offers several improvements over conventional protocols for secure multi-party communication.

By using a short-term pre-placed authentication key AK(i) and renewing the authentication key AK(i) in QKD, the window of opportunity for an adversary to break a given authentication key AK(i) is reduced.

Public key cryptography is not required. Instead, QKD provides for generation of shared random numbers with forward security. Notably, the encryption keys K(i, j) and key derivation keys L(i, j) have forward security—they are not derived algorithmically from pre-placed keys shared with trusted authority. QKD thus provides superior forward security assurances and flexible key replacement without the archival attack concerns of existing approaches. Through the use of fillguns that store and disseminate keys from QKD, the protocol extends the advantages of QC (forward secrecy, and immunity to archival attacks) to users who have no direct quantum link. Secret session keys that are randomly generated and encrypted with encryption keys K(i, j) also have forward security.

A dishonest or compromised user (or coalition of such users) cannot compromise the communications between other users. Instead, the communications between the other users rely on different encryption keys and key derivation keys specific to those other users.

The trusted authority can be online during a communication session between users, but can also be offline. In general, the trusted authority need not be online after relevant elements of the pair keys P(i, j) and key authentication values A(i, j) have been distributed to users.

The pair keys P(i, j) and key authentication values A(i, j) can be provided over a non-secure network such as a public network. Without knowledge of the encryption keys K(i, j) and key derivation keys L(i, j), the pair keys P(i, j) are useless for deciphering the communications secured by the encryption keys K(i, j).

The secure multi-party communication protocols with QKD can be used in diverse scenarios, including scenarios with a satellite-based trusted authority supporting global secure communications between coalitions of land, sea and air-based users. The protocols can also be used in scenarios in which the trusted authority is a QC node in a transparent optical network such as an optical access network, or an enterprise or metro-area network. In scenarios in which QC cards acquire keys through QKD with a trusted authority, the protocols support the use of QC cards for access control, secure telephone calls, key delivery or other purposes.

The secure multi-party communication protocols can be extended with group keying to support secure teleconferencing among a large group of users. More generally, the secure multi-party communication protocols provide the ability to create an ad hoc secure group of users with group keying.

F. Example Password-based Authentication Using a QIP

Password-based authentication using a quantum identification protocol ("QIP") can be performed between a given user device and trusted authority before beginning one of the above-described QKD protocols. For example, password-based authentication using a QIP is used to generate an initial authentication key (instead of using a pre-placed authentication key), and then one of the above-described QKD protocols is used to perform QKD between the trusted authority and user device to establish keys for secure multi-party communication or another purpose.

In password-based authentication using a QIP, a password w(i) for a user i is shared with the trusted authority. Different users have different passwords. The trusted authority stores the different passwords for the respective users in secure memory in the system that implements the trusted authority. The password w(i) is used for authentication between the trusted authority and a user i, but the password w(i) is not itself communicated between the user and trusted authority, even in encrypted form. As such, information about the password w(i) is not revealed according to the QIP, and the password may be used multiple times without compromising security.

The constituent parts of a password w(i) depend on implementation. For example, a password w(i) can include: (1) a part that is input by the user i and is relatively easy for the user to memorize (such as a series of 8 to 12 alphanumeric characters or special ASCII characters on a conventional keyboard), (2) a part that is stored in secure memory on the user device (such as a longer string of random bits defining a high entropy key), and/or (3) a part that represents a digest of biometric indicia (such as fingerprint scan data) provided by the user i. Alternatively, the password w has other and/or additional parts.

For authentication between the user i and trusted authority, the password w(i) is used within a QIP to convince the trusted authority that the user is not an imposter, and to prevent an honest user from establishing quantum keys with a fake trusted authority. If a fake trusted authority cannot impersonate a real trusted authority, the fake trusted authority cannot convince an authorized user to perform QKD with the fake trusted authority. For example, as part of the QIP:

a user device for user i generates a string of random bits, encodes the bits as quantum states according to randomly assigned bases (e.g., rectilinear or diagonal), and transmits (via quantum channel) such quantum state information to the trusted authority;

the trusted authority receives the quantum state information and measures quantum states according to a pattern of bases that depends on the password w(i) (e.g., using a pattern of rectilinear/diagonal measuring bases selected as a function of the password w(i));

the user device i selects a first hash function to be applied to shared secret bits from the QIP, and the user device transmits (via conventional channel) an indication of the first hash function to the trusted authority along with the pattern of sending bases it used in quantum transmission;

the user device i and trusted authority each determine shared secret bits for the QIP as those bits for which sending basis matched measuring basis (the user device itself determines the pattern of measuring bases from the password w(i));

the trusted authority selects a second hash function to be applied to the password w(i), and the trusted authority transmits (via conventional channel) an indication of the second hash function to the user device i along with a message authentication code that depends on part (e.g., high entropy key) of the password w(i);

the user device i authenticates the trusted authority based on the message authentication code and its stored version of the part (e.g., high entropy key) of the password w(i);

the user device i computes a check value based on (a) application of the first hash function to its version of the shared secret bits and (b) application of the second hash function to the password w(i), and the user device transmits (via conventional channel) the check value to the trusted authority; and the trusted authority computes its own version of the check value and compares it to the check value received from the user device i, so as to authenticate the user device.

For additional details about variations of QIPs, see, e.g., Damgard et al., "Secure Identification and QKD in the Bounded-Quantum-Storage Model," Crypto 2007, Lecture Notices Computer Science 4622, pages 342-359 (2007).

In the QIP, the string of secret bits determined by the user device i will match the string of secret bits determined by the trusted authority only if the trusted authority has the password w(i) and the user device has the password w(i). Otherwise, the pattern of measuring bases determined at the trusted authority will not match the pattern of measuring basis determined at the user device i. Moreover, without betraying details of the password w(i), the QIP allows the trusted authority to verify the user's identity and convinces the user that the trusted authority is legitimate.

The secret random bits that result from the QIP can be used to generate an initial authentication key $AK_0$ to use for authentication of the user when establishing quantum keys with the trusted authority. The secret bits that result from the QIP are shared by the user device and trusted authority. Some or all of the secret bits can be directly used to form the key $AK_0$, or some or all of the secret bits can be hashed to form the key $AK_0$. The user device and trusted authority then use the key $AK_0$ to initiate QKD to establish keys for secure multi-party communication or another purpose according to one of the above-described QKD protocols. One of the keys established in QKD can be used to update part of the password w(i) (e.g., to replace the high entropy key in secure memory at the user device and trusted authority) instead of updating the key $AK_0$. Or, the same password w(i) can simply be reused for future authentication. Alternatively, password-based authentication using a QIP is itself used to establish a trust relationship between the trusted authority and given user (instead of later authentication using an initial authentication key $AK_0$).

Password-based authentication using a QIP can provide security in the event of loss of a user device. Without the part of a password that a user provides as input (or without the biometric indicia that the user provides as input), a non-authorized user cannot convince the trusted authority to accept him as the authorized user of the device, and the non-authorized user is unable to use the device to perform QKD with the trusted authority.

G. Example Hierarchy of Trusted Authorities

In the above-described QKD protocols, a trusted authority establishes keys by QKD with each of multiple users. A trusted authority can be part of a hierarchy of trusted authorities, in which case the trusted authority establishes keys with a sub-network of one or more users. Users associated with different trusted authorities can establish shared secret keys through an intermediary trusted authority in the hierarchy.

For example, a hierarchy includes two child trusted authorities and a parent trusted authority that acts as an intermediary. The first child trusted authority is associated with one or more users in a first sub-network. In particular, the first child trusted authority distributes keys by QKD under a trust relationship with a first user in the first sub-network. The second child trusted authority is associated with one or more users in a second sub-network. In particular, the second child trusted authority distributes keys by QKD under a trust relationship with a second user in the second sub-network.

The first child trusted authority is also operable to engage in QKD with the parent trusted authority. (And the second child trusted authority is operable to engage in QKD with the parent trusted authority.) The first child trusted authority retrieves keys that result from QKD with the parent trusted authority, and the first child trusted authority uses one of the keys from QKD with the parent trusted authority (and one of the keys from QKD with the first user) to facilitate secure communication between the first user and second user.

For example, the first child trusted authority receives an encrypted session key from the parent trusted authority and decrypts the encrypted session key using one of its keys from QKD with the parent trusted authority. The first child trusted authority re-encrypts the session key using one of its keys from QKD with the first user, and distributes the re-encrypted session key to the first user device. Similarly, the second child trusted authority receives an encrypted version of the session key from the parent trusted authority, decrypts the encrypted session key using one of its keys from QKD with the parent trusted authority, re-encrypts the session key using one of its keys from QKD with the second user, and distributes the re-encrypted session key to the second user device. Each of the first and second user devices decrypts the encrypted session key using its key from QKD with its trusted authority, then uses the session key for secure communication or another purpose. More generally, following one of the above-described group keying protocols, the parent trusted authority can operate as a group leader, with each of the child trusted authorities operating as a sub-group leader. In this configuration, the respective trusted authorities are separate physical nodes that perform QKD with other nodes and user devices, not just separate logical nodes.

Alternatively, instead of using keys established by QKD to share session keys, a child trusted authority uses combination keys together with keys established by QKD to facilitate secure communication between users. For example, a first child trusted authority retrieves an authority-to-authority combination key that is distributed by the parent trusted authority. The authority-to-authority combination key (as a pair key) is based on one of the keys from QKD between the first child trusted authority and the parent trusted authority, and it is also based on a key from QKD between the second child trusted authority and the parent trusted authority. The first child trusted authority uses the authority-to-authority combination key (as a pair key) and its key from QKD with the parent trusted authority to derive the key for the second child trusted authority. The first child trusted authority then communicates with the second child trusted authority to determine a user-to-user combination key. The user-to-user combination key (as a pair key) is based on one of the keys from QKD with the first user and is also based on one of the keys for the second user (from QKD between the second user and second child trusted authority). The first child trusted authority makes the user-to-user combination key available for distribution to the first user device, which can use the user-to-user combination key and its key from QKD with the first child trusted authority to determine the key for the second user device.

In the preceding examples, one parent trusted authority is an intermediary between two child trusted authorities in a hierarchy. Alternatively, the hierarchy includes more trusted authorities at a given level and/or more levels of trusted authorities.

H. Example Distributed Trusted Authority Functions

A computing system implements the role of a trusted authority, and the computing system can be located at a single physical location or distributed among multiple physical locations. The above-described QKD protocols can be implemented in a configuration in which the functions of a trusted authority are distributed across multiple physical nodes. Distribution of trusted authority functions across multiple physical nodes can help protect against failure or compromise of any given one of the nodes.

If the functions of a trusted authority are associated with a single physical node, the single node constitutes a single point of potential failure or compromise. To mitigate this risk, quantum secret sharing can be used to distribute the functions of a trusted authority across two or more physical nodes. Instead of QKD between a user device and single physical node for the trusted authority, the user device performs quantum secret sharing with the multiple physical nodes constituting the trusted authority. For example, a first user device uses quantum secret sharing to facilitate first QKD for a first user and the multiple physical nodes of the trusted authority; and a second user device uses quantum secret sharing to facilitate second QKD for a second user and the multiple physical nodes of the trusted authority. For details about variations of quantum secret sharing, see, e.g., Hillery et al., "Quantum Secret Sharing," Physical Review A, vol. 59, no. 3, pages 1829-1834 (1999). In this way, loss or compromise of any single physical node of the trusted authority does not prevent or compromise key establishment between users.

V. QKM Innovations.

This section describes various QKM innovations, which harness QC to form a cryptography system within a PKI framework. In general, the QKM innovations are computationally lightweight and relatively fast, and can be implemented in hardware relatively efficiently. This makes the QKM innovations especially suitable for use in devices with constrained resources such as handheld devices and in smart grid applications. Also, the QKM innovations are scalable, relatively simple to deploy and manage, and compatible with the certificate authority infrastructure of current PKI architectures.

In example implementations, the QKM innovations combine QKD and a quantum identification protocol ("QIP") with a Merkle signature scheme (using Winternitz one-time digital signatures or other one-time digital signatures, and Merkle hash trees) to constitute a cryptography system. The Merkle signature scheme can be implemented in various ways, including a Coronado Merkle signature scheme ("CMSS"), eXtended Merkle Signature Scheme ("XMSS") or original implementation for Merkle signature scheme to traverse a hash tree. More generally, the QKM innovations can combine QKD and a QIP with a hash-based signature scheme. In several respects the QKM innovations extend or provide variations of the secure multi-party communications describe in Section IV. The QKM innovations introduce a non-repudiation capability, using digital signatures. The trusted authority adapts the usual registration authority and certificate authority functions of a PKI, including enrollment, signing of users' non-secret keys that are used to form shared secret keys, and verification of users' signatures. Thus, as a certificate authority, the trusted authority can generally provide services of certificate directory, in the context of QKD and QIP. The QKM innovations include ways to replenish one-time digital signature keys (and accompanying signature verification keys) securely.

In examples in this section, the primary parties of interest are the trusted authority, a first user (of a first user device) and a second user (of a second user device). Typically, the trusted authority acts in the role of registration authority and certificate authority. Alternatively, however, the roles of trusted authority, registration authority and certificate authority can be split among different entities connected through trust relationships. The trusted authority can be a single trusted authority or hierarchy of trusted authorities. In example scenarios, the first user sends a secure message that the first user knows will be readable by the second user, which the first user cannot later repudiate. The second user receives the message from the first user and confirms that it originated with the first user. The second user cannot deny his ability to read the message.

In these examples, certain assumptions are made about infrastructure. The trusted authority and first user share a classical channel and quantum channel. The trusted authority and second user also share a classical channel and quantum channel. The first and second users share a classical channel only.

At a high level, various features of the QKM innovations may be used in combination or separately to provide one or more of the following benefits and services. For example, the trusted authority assists in the following.

First. The first and second users can be securely enrolled (in person or otherwise) with the registration authority. For example, each user establishes a secret password shared with the registration authority, and the registration authority provides each user with his (that is, the registration authority's) public signature verification key. Additionally, each user can provide the registration authority with the user's public signature verification key.

Second. The first user can derive a secret encryption key K(2, 1) for securing communications to the second user. The first user has strong assurance that the key is the second user's encryption key because of the certificate authority's one-time digital signature on a non-secret key of the second user. The second user cannot repudiate that K(2, 1) is his secret encryption key.

Third. The first user can apply a one-time digital signature to a message from the first user to the second user. With the certificate authority's assistance, the second user can verify the signature of the first user, so that the first user cannot deny that she sent it.

Fourth. The registration authority can securely replenish his one-time digital signing keys and securely provide his new signature verification key to the first and second users.

Fifth. The first user (or the second user) can securely replenish her (his) one-time digital signing keys, and securely provide her (his) new public signature verification key to the registration authority.

A. Example Implementations of QKM Innovations

Example implementations incorporate multiple features of the QKM innovations.

1. Example Signature Keys and Verification Information

In the example implementations, the digital signature keys are Winternitz one-time digital signature keys (whose basis is a Lamport-Diffie one-time signature scheme), and the verification information is a signature verification key at the root of a Merkle hash tree. Details about generation and use of Winternitz one-time digital signature keys, Merkle hash trees, and Merkle signature schemes can be found in many references. For example, see Becker, "Merkle Signature Schemes, Merkle Trees and Their Cryptanalysis" (2008). A Merkle signature scheme can be implemented using a CMSS, XMSS or other approach.

Figure 10A:
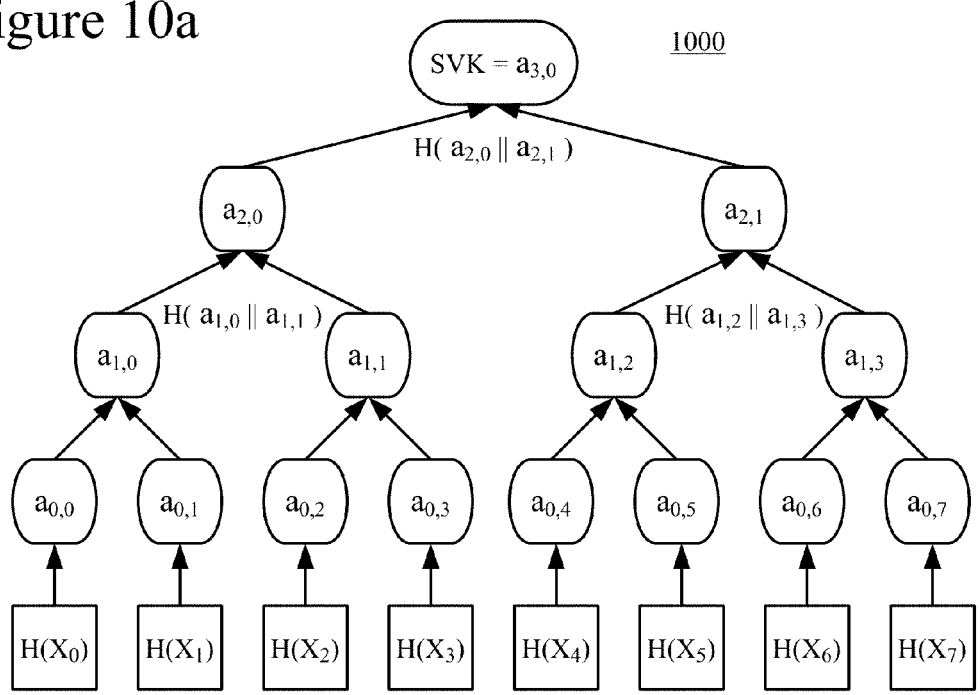
FIGS. 10a and 10b are diagrams illustrating features of an example Merkle hash tree.

FIG. 10a shows an example Merkle hash tree (1000) with 8 leaf nodes, and illustrates aspects of key generation and generation of verification information. In practice, a Merkle tree usually has more nodes (e.g., 512 leaf nodes or 1024 leaf nodes). In FIG. 10a, a node is labeled $a_{i,j}$, where i indicates the level of the node in the hash tree, and j indicates the position of the node at that level (numbered left to right in FIG. 10a).

For each leaf node j, a Winternitz one-time digital signature key $X_j$ is generated (e.g., using a random number generator) and hashed. In general, the hash function H( ) is a cryptographically secure one-way hash function, and need not be the same as the hash function used elsewhere herein. Typically, the hash function is computationally simple and lightweight, making the entire Merkle hash tree computationally simple and lightweight.

The values at two adjacent leaf nodes are in turn hashed using the hashing function, as shown in FIG. 10a. For example, the values at nodes $a_{0,0}$ and $a_{0,1}$ are hashed to produce a value at node $a_{1,0}$. At the next level up, the values at adjacent nodes are again hashed using the hashing function, as shown in FIG. 10a. For example, the values at nodes $a_{1,0}$ and $a_{1,1}$ are hashed to produce a value at node $a_{2,0}$. This process continues until the value of the root node is determined. The root node of the Merkle hash tree (1000) is the signature verification key ("SVK"). The SVK is an example of verification information, in that it is used to check the identification or certification of a message signed with any of the one-time digital keys $X_i$ in the tree (1000). The verification information (here, the SVK for the Merkle hash tree) can be distributed in a way that is secure, as described below, and in a way that the creator of the verification information is authenticated, as described below.

Figure 10B:
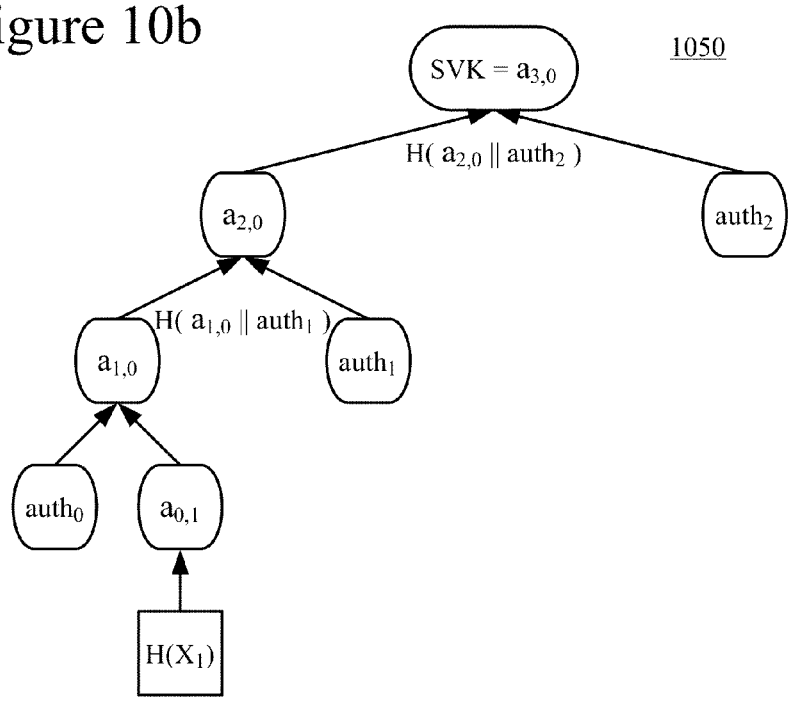

When one of the digital signature keys $X_j$ is used, the entity that generated the digital signature key (e.g., user device, trusted authority) signs a message using the digital key. The signed message sig is transmitted, including information that identifies the leaf node for that key $X_j$ and provides authentication values for the path of the leaf node up to the SVK. For example, if the key $X_1$ is used, the signature information includes the signature value resulting from application of the key $X_1$ to the message along with authentication values for intermediate nodes along the path up to the SVK. In FIG. 10b, the authentication values for the intermediate nodes are shown as $auth_0$, $auth_1$ and $auth_2$.

FIG. 10b shows aspects of key verification for the Merkle hash tree (1050), which corresponds to the tree (1000) of FIG. 10a. With the signature value and authentication values, the recipient can reconstruct an appropriate value $H(X_j)$ for the leaf node and determine hashed values at successively higher levels of the tree. For example, the recipient hashes the signature value sig using a related variation H''( ) of the hash function H( ), so as to determine the value H''(sig). H''(sig) is expected to be equal to $H(X_i)$ for verification to succeed, even though the recipient does not have the secret signature key $X_i$. The recipient then hashes that value H''(sig) with an authentication value for the intermediate node for the appropriate level, repeating the process level after level with the result of the prior hashing operation and the authentication value for the next intermediate node, to locally determine the root node SVK. The recipient can then compare the locally determined SVK at the root node with the previously received SVK. If the values match, the signature is verified. For example, in FIG. 10b, the recipient reconstructs the value $H(X_1)$ for node $a_{0,1}$ (actually, H''(sig) using the signature sig and the identity of the node $a_{0,1}$), then hashes the value $H(X_1)$ with the authentication value $auth_0$ received as part of the signature, yielding a hashed value for node $a_{1,0}$. The recipient hashes this value with the next-level authentication value $auth_1$, and so on, until the recipient determines a value for the SVK at the root node, which the recipient compares to the previously received SVK.

Alternatively, the digital signature keys are a different type of one-time digital signature key (e.g., Lamport signature keys), rather than Winternitz keys. As noted, the hash function that is used can depend on implementation, and can be essentially any cryptographically secure one-way hash function, although a hash function that is computationally lightweight improves performance. Instead of a Merkle hash tree and SVK as verification information, another form of public/private key framework could be used for the verification information.

2. User Enrollment with Registration Authority (Trusted Authority)

In example implementations, in a first stage, a user initially enrolls with the registration authority, which is the trusted authority in the example implementations. Typically, this initial enrollment is done in person. Alternatively, registration could be performed remotely so long as procedures are followed for user identification and authentication. Different users can separately enroll with the registration authority (trusted authority).

For example, a first user provides the trusted authority with a secret password so the first user can later perform quantum secure identification with the trusted authority. This password can be a strong, secret password for a quantum identification protocol used in setting up later QKD. The QIP protocol can also incorporate a picture identification, biometric signature information as described in Section IV, etc.

The trusted authority generates multiple secret one-time digital signature keys and constructs a Merkle hash tree from them. The trusted authority distributes the SVK of the Merkle hash tree to the first user, for use as the public signature verification part of the Merkle signature scheme. The trusted authority can repeat this process for a second user, third user, etc. In doing so, the trusted authority can generate digital signature keys, a Merkle hash tree and SVK specific to interaction with that user. Or, the trusted authority can use the same keys and distribute the same SVK for all users, in which case the SVK is necessarily more widely disseminated.

As part of the initial enrollment or separately, a given user can also generate multiple secret one-time digital signature keys, construct a Merkle hash tree from them, and thereby determine a SVK. The user provides the initial SVK to the trusted authority. If this process happens after QKD, the user can provide the SVK by secure transfer, using an encryption key from shared secret bits established in QKD (from the second stage). This process can be performed by the first user, second user, etc.

The trusted authority and/or any given user can repeat the process of generating secret digital signature keys, constructing a Merkle hash tree, and distributing a new SVK value in order to replenish digital signature keys. In this case, the new SVK can be distributed by secure transfer, using an encryption key from shared secret bits established in the QKD (from the second stage). Or, the trusted authority and user can engage in a new round of in-person enrollment.

FIG. 11 illustrates a protocol (1100) for registration. In the example shown in FIG. 11, the trusted authority generates digital signature keys $X_0$(TA, 1, count)—a first set of private keys $X_0$ generated by the trusted authority (TA) for interaction with user 1, where the number of keys generated is indicated by "count." The trusted authority generates a hash tree $T_0$(TA, 1) for this set of keys, and distributes the verification information $V_0$(TA, 1), which is an SVK, to the first user device.

The first user device receives the verification information $V_0$(TA, 1). As a conceptually separate series of events, which could precede, follow, or happen concurrently with the key generation, etc. by the trusted authority, the first user device generates digital signature keys $X_0$(1, TA, count)—a first set of private keys $X_0$ generated by the first user device for interaction with the trusted authority (TA), where the number of keys generated is indicated by "count." The first user device generates a hash tree $T_0$(1, TA) for this set of keys, and distributes the verification information $V_0$(1, татоlicit TA), which is an SVK, to the trusted authority.

The first user device also engages in QKD with the trusted authority (as described in more detail in the next section), for example, establishing shared secret bits for encryption keys K(1, j), key derivation keys L(1, j), a key authentication key M(1) and a new authentication key $AK_1$(1). The trusted authority can repeat this enrollment process and QKD with any other user. In doing so, the trusted authority can generate a separate set of digital signature keys for the trusted authority to use when interacting with each user, or the trusted authority can use the same set of digital signature keys for interacting with multiple users.

Subsequently, the trusted authority and/or first user device can replenish digital signature keys, as shown in FIG. 11. In this case, the verification information for the new set of digital signature keys can be distributed in encrypted form using the secret key $AK_1$(1) from the QKD. For example, the trusted authority encrypts verification information $V_1$(TA, 1) for new keys $X_1$(TA, 1, count) and their new hash tree $T_1$(TA, 1) using the key $AK_1$(1).

3. QC Between Users and Trusted Authority

In a second stage in the example implementations, the trusted authority manages QKD with the respective user devices. For example, a first user device and the trusted authority engage in QC. Although not shown in FIG. 11, the first user device and trusted authority can engage in authentication using a QIP, for example, as described in section IV.F. In quantum secure identification, the first user is identified to the trusted authority, and an authentication key—a short string of shared secret bits—is produced for initiating a QKD session. The first user and the trusted authority perform QKD, resulting in a long string of shared secret random bits. From this long bit string, they parse secret keys for encryption keys K(1, j), key derivation keys L(1, j), a key authentication key M(1) and a new authentication key $AK_1(1)$, which are shared by the first user and the trusted authority. For example, the keys are each 256 bits.

Similarly, the second user and the trusted authority engage in QC and QKD, resulting in secret keys for encryption keys $K(2, j)$, key derivation keys $L(2, j)$, a key authentication key $M(2)$ and a new authentication key $AK_1(2)$, which are shared by the second user and the trusted authority.

Section IV describes example process for QC and QKD between a user and the trusted authority. The quantum identification protocol can use the protocol described in section IV.F or another form of QIP.

4. User-to-User Secret Key Establishment

In a third stage in the example implementations, a user determines a secret key that can be used for secure communication with another user. In this stage, the trusted authority mediates the transaction, acting as a certification authority, rather than simply handing out a combination key (pair key) as in Section IV. In the following example, a first user seeks to determine an encryption key for secure communication with a second user. In practice, any user in the environment can request the non-secret key of any other user.

The first user requests that the trusted authority provide the first user with the second user's non-secret key. The non-secret key can include a pair key as well as a key authentication value as described in section IV. For example, for a first user device to establish secure communication with a second user device using the encryption key $K(2, 1)$, the first user device requests the pair key $P(1, 2)$ and the key authentication value $A(1, 2)$.

Over a classic channel, the trusted authority sends the non-secret key of the second user, which is the pair key $P(1, 2)$ and the key authentication value $A(1, 2)$ for the second user. As noted in section IV, these values are defined as $P(1, 2)=L(1, 2) \oplus K(2, 1)$ and $A(1, 2)=H[K(2, 1); M(1)]$. The trusted authority signs the non-secret key using one of its one-time digital signature keys for interaction with the first user, e.g., $X_0(TA, 1, 0)$. The signature is represented as sig [non-secret key; $X_0(TA, 1, 0)$], where the non-secret key is the concatenation of $P(1, 2)$ and $A(1, 2)$. The function sig [mess; p] represents the digital signature key p applied to the message mess. The signature function can be a hash function such as SHA-256 or other hash function.

As explained in section IV, using the pair key $P(1, 2)$ from the non-secret key and its previously received key derivation key $L(1, 2)$ (from QKD), the first user can determine the encryption key $K(2, 1)$ as $K(2, 1)=L(1, 2) \oplus P(1, 2)$. The first user can authenticate the encryption key using the key authentication value $A(1, 2)$ from the non-secret key and its previously received key authentication key $M(1)$ (from QKD). The first user computes a check value check_value=$H[K(2, 1); M(1)]$, and compares the check value to the key authentication value $A(1, 2)$. If they match, the key is authentic.

Additionally, the first user verifies the trusted authority's signature on the non-secret key of the second user. The first user can thus confirm the non-secret key was actually received from the certificate authority. By extension, this provides assurance (from the trusted authority as certificate authority) that the first user has in fact derived the encryption key of the second user, and not some other party. In particular, the trusted authority can confirm (by signing the non-secret key of the second user) that the user privileges of the second user have not been revoked. Through the trusted authority, the first user can confirm that the second user is still a valid user. The first user can then use the encryption key $K(2, 1)$ for secure communication with the second user.

For example, to verify the signature, the first user uses the SVK from the trusted authority (as registration authority). Using the signature, the first user determines a hash value for the appropriate leaf node of the trusted authority's Merkle hash tree. The first user hashes this value with an authentication value at successive levels of the tree to determine a value at the root node, which the first user compares with the SVK previously received from the trusted authority (as registration authority).

Another feature of the protocol is non-repudiation. The signature on the non-secret key binds the message to the trusted authority. If the trusted authority uses a valid signature, the trusted authority cannot later deny that it is the entity that distributed the non-secret key.

FIG. 12a illustrates operations (1200) in this stage of the protocol. To initiate the process of communicating with user device 4, user device 1 requests the non-secret key of user device 4 from the trusted authority, where the non-secret key is the concatenation of the pair key $P(1, 4)$ and key authentication value $A(1, 4)$. The trusted authority receives the request and checks the credentials of user 4. If the credentials are valid, the trusted authority determines the pair key $P(1, 4)$ and key authentication value $A(1, 4)$. The trusted authority signs the non-secret key using one of its signature keys $X_0(TA, 1, a)$. The trusted authority then sends the non-secret key (that is, $P(1, 4) \| A(1, 4)$) and signature sig $[P(1, 4) \| A(1, 4); X_0(TA, 1, a)]$ to user device 1.

User device 1 receives the non-secret key and signature. User device 1 checks the signature of the trusted authority using the verification information $V_0(TA, 1)$ from the trusted authority (e.g., SVK) and the signature sig $[P(1, 4) \| A(1, 4); X_0(TA, 1, a)]$. If the signature is valid, user device 1 derives the encryption key $K(4, 1)$ from the pair key $P(1, 4)$ and its key derivation key $L(1, 4)$. User device 1 can check the encryption key $K(4, 1)$ using its authentication key $M(1)$ and the key authentication value $A(1, 4)$. The next operations shown in FIG. 12a and the operations shown in FIG. 12b are described in the next section.

In this example, the trusted authority is online to act in the role of certificate authority in response to the request from user device 1. Alternatively, in an offline role, the trusted authority (certificate authority) publishes signed versions of the non-secret keys for users, using appropriate digital signature keys. In the offline role, the trusted authority (certificate authority) can check credentials of users from time to time, but such checking is not responsive to a live request from a user device.

5. User-to-User Secure Communication and Signatures

In a fourth stage in the example implementations, a user securely communicates with another user using the encryption key of that other user. Again, the trusted authority can mediate the transaction, acting as a certification authority. Again, in the following example, a first user seeks to securely communicate with a second user. In practice, any user in the environment can securely communicate with any other user.

The first user encrypts a message for the second user with the derived encryption key of the second user. The first user signs the message using one of the digital signature keys of the first user. The first user then sends the encrypted, signed message to the second user over a classical channel.

The second user decrypts the message from the first user using the encryption key $K(2, 1)$. To verify the signature of the first user, the second user requests the verification information of the first user from the trusted authority (as certificate authority) over a classic channel. This provides an opportunity for the trusted authority to confirm to the second user that the credentials of the first user have not been revoked. If the first user is no longer registered, the trusted authority can refuse to provide the verification information (e.g., SVK) of the first user to the second user.

Assuming the credentials of the first user are still valid, the trusted authority sends the verification information of the first user to the second user over a classic channel. The trusted authority can sign the verification information of the first user using one of the trusted authority's own one-time digital signature keys.

The second user verifies the signature of the trusted authority on the verification information of the first user. For example, the second user determines a hashed value from the signature, successively hashes the value with authentication values provided with the signature to determine an SVK value, and compares the SVK to the SVK previously received from the trusted authority (as registration authority). The second user can similarly verify the signature of the first user on the signed message from the first user, using the signature on the message and the verification information received from the trusted authority.

If the second user already has verification information for the first user when the message is received, the second user can use such information, without requesting such information from the trusted authority. In this case, however, the trusted authority is not given the opportunity (as an online certificate authority) to check that the credentials of the first user are still valid.

Returning to the example shown in FIGS. 12a and 12b, user device 1 encrypts a message x using the encryption key K(4, 1), producing an encrypted message E[message x; K(4,1)]. User device 1 signs the message x using one of its one-time digital signature keys $X_0(1, \text{any}, a)$, which may be used for communication with any user. User device one sends the signed, encrypted message to user device 4.

User device 4 receives the encrypted message E[message x; K(4,1)] and signature sig [E[message x; K(4,1)]; $X_0(1, \text{any}, a)$]. Turning to FIG. 12b, for its part, user device 4 initiates the process of communicating with user device 1 by requesting verification information $V_0(1, \text{any})$ for user device 1.

The trusted authority (as an online certificate authority) receives the request and checks the credentials of user 1. If the credentials are valid, the trusted authority determines the verification information $V_0(1, \text{any})$ and signs it using one of its digital signature keys $X_0(TA, 4, a)$ for interaction with user device 4. The trusted authority sends the signed verification information to user device 4.

User device 4 receives the verification information $V_0(1, \text{any})$ and signature sig [$V_0(1, \text{any})$; $X_0(TA, 4, a)$]. User device 4 checks the signature of the trusted authority using the signature and verification information $V_0(TA, 4)$ previously received from the trusted authority (as registration authority). If the signature of the trusted authority is valid, user device 4 checks the signature of user device 1 using the signature from user device 1 and verification information $V_0(1, \text{any})$ just received from the trusted authority (as certificate authority). If the signature of user device 1 is valid, user device 4 decrypts the message from user device 1 using its encryption key K(4, 1).

In this example, the trusted authority is online to act in the role of certificate authority in response to the request from user device 4. Alternatively, in an offline role, the trusted authority (certificate authority) publishes signed versions of the verification information for users, using appropriate digital signature keys. In the offline role, the trusted authority (certificate authority) can check credentials of users from time to time, but such checking is not responsive to a live request from a user device.

6. Secure Replenishment of Digital Signatures

As noted, in typical usage scenarios, each digital signature key is used only one time. Eventually, the trusted authority or a user may run out of digital signature keys from the initial enrollment. The trusted authority and/or user can securely replenish digital signature keys (and distribute new verification information) as follows.

The trusted authority generates new secret digital signature keys. The trusted authority also generates new verification information, e.g., forming a new Merkle hash tree and computing a new SVK value. Using a shared secret key previously established with the user (e.g., AK(1) from QKD), the trusted authority encrypts and authenticates the new verification information, and transmits it to a user. The user decrypts the verification information and updates its stored verification information for the trusted authority. The trusted authority can distribute the new verification information to other users, or similarly generate new digital signature keys and distribute new verification information per other user.

Conversely, a user can replenish its digital signature keys and securely provide the trusted authority with the user's new verification information (encrypted using a key produced in QKD and shared with the trusted authority), if the user runs out of digital signature keys from enrollment.

Alternatively, the user and/or trusted authority (as registration authority) can replenish digital signature keys in another way, which does not involve distribution of new verification information. For example, the user and trusted authority, having already established (in QKD) a series of shared secret bits to use as keys, can parse a range of the shared secret bits for one of them (user or trusted authority) to use as digital signature keys. From the digital signature keys, the user and trusted authority can each independently construct a Merkle hash tree and verification information (here, a SVK as root node of the tree).

Or, for more economical utilization of the shared secret bits from QKD, the user and trusted authority can use a single agreed-upon key of the shared secret bits from QKD as the seed of a random number generator or other function, which generates a longer series of shared secret bits for use as digital signature keys by the user or trusted authority. Again, from such digital signature keys, the user and trusted authority can each independently construct a Merkle hash tree and verification information. Because the Merkle hash tree and verification information are independently determined at each side, no verification information needs to be transmitted.

The entity (user or trusted authority) that will use the digital signature keys can store the Merkle hash tree and digital signature keys. Or, to reduce storage when the digital signature keys have been created from a seed value, the entity (user or trusted authority) that will use the digital signature keys can store only the seed value and a record of which node/key was last used, in which case the entity can reconstruct the digital signature keys and Merkle hash tree as needed.

7. User Revocation and Other Features

As mentioned above, one aspect of the protocol in the example implementations is credential checking by the trusted authority (as certificate authority). In expected usage scenarios, a user-to-user encryption key is used for a short while (e.g., one message). A user regularly checks back with the trusted authority to get a pair key to derive the next encryption key, or to get verification information to evaluate the signature of a signed message. This provides a chance for the trusted authority (as certificate authority) to check a user's credentials. At various stages, the trusted authority can block a transaction from completing, or at least warn a user that another user is not validated. For example, by refusing to provide a non-secret key (including a pair key), the trusted authority can prevent a user from determining an encryption key for another user. Or, by refusing to provide verification information, the trusted authority can signal that a user is no longer authorized.

In theory, the trusted authority can retain encryption keys. In this way, communications between users can be reconstituted if encryption keys are otherwise lost.

Typically, different encryption keys are used for communications from the first user to the second user, compared to communications from the second user to the first user. As such, if the second user is compromised, an unauthorized user still cannot encrypt messages to the first user or other users.

In many of the preceding examples, the trusted authority is "online" during secure multi-party communication. Alternatively, the trusted authority is offline during secure multi-party communication, only periodically online, or not necessarily online as a condition for secure multi-party communication. For such alternative scenarios, the trusted authority (as certificate authority) can sign the non-secret keys of users and sign verification information of users, and distribute such signed materials as appropriate to the respective users in the environment. For example, for a given user, the trusted authority signs non-secret keys of the other users, signs verification information of the other users, and distributes such signed information to the given user. Each user can store the signed non-secret keys and signed verification information from the trusted authority to use as needed to encrypt, sign, decrypt, verify, etc. signatures of messages to/from other users. In such scenarios, the trusted authority is not necessarily involved at the time such messages are sent/received. If the trusted authority is online, a user can still check with the trusted authority that the credentials of another user are still valid. Also, the trusted authority can periodically distribute current versions of the signed non-secret keys and signed verification information, so that the trusted authority periodically validates which users are still authorized.

8. Example Use Scenarios for QKM Innovations

This section describes example use scenarios for QKM innovations. Some examples illustrate low-latency signature and verification of one or more unicast messages using digital signatures. Other examples illustrate low-latency signature and verification for multicast messages using digital signatures. The above-described QKM innovations can be applied for either unicast or multicast messages to provide for signing of streaming data or other data, authentication of the sender and verification. The signatures can be used such that only one authorized recipient can verify the signatures on the messages ("directed digital signatures"). Or, the signatures can be used such that a representative recipient can verify the signatures on behalf of a group ("arbitrated digital signatures"), to provide a designated confirmer functionality, if desired.

Overall, these example use scenarios happen within a QKM framework such as one of the frameworks described above. In this framework, multiple users are able to perform QC with a trusted authority, but not with each other. The QKM innovations provide cryptographic services for conventional user-to-user communications, including encryption, authentication and non-repudiation (signatures). For these use scenarios, each user has already successfully enrolled in the QKM, and each is capable of performing QKD with the trusted authority. Within the group of users, there is an i-member subset of users $A_1 \ldots A_i$ who send messages, and a j-member subset of users $B_1 \ldots B_j$ who receive messages. A given user can both send and receive messages, in some cases. Some users may not be authorized as sender or recipient of messages.

In general, a message signer applies a one-time digital signature to a message. The one-time digital signature can use a Winternitz or Lamport digital signature, for example, or some other kind of digital signature. A message recipient is able to verify the signature using a public SVK or other verification information. For example, the SVK can be the root value of a Merkle hash tree when multiple messages are to be signed.

In some implementations, each party (whether sender, recipient or trusted authority) has the ability to generate cryptographically strong pseudo-random numbers using a random number generator such as a deterministic random number generator ("DNRG"). For example, the DNRG can be a NIST-approved ANSI X9.31 DRNG based on triple-DES or AES, using a secret seed as input. Alternatively, another type of DRNG is used. Each party (whether sender, recipient or trusted authority) is also able to execute a cryptographic hash function H(). The hash function H() can be a member of the SHA family (e.g., SHA-256) or another hash function.

a. Single Unicast Message Signed by a Single Sender

In one use scenario, a single user A signs a single message M to a single user B, who may confirm the signature of the sender A.

The user A performs QKD with the trusted authority. The shared secret bits from the QKD include an authentication key $AK_1(A)$ for the user A, where the subscript 1 indicates the version of authentication key for the user A. The QKD also results in a secret signing key $X_0(A, any, 1)$ for the user A to use when signing a message to any other party, where the subscript "0" indicates the batch of keys, A indicates the user of the key, "any" is the intended recipient of signed message(s), and 1 is the count of keys in the batch. The secret signing key is shared between the user A and the trusted authority. The secret signing key $X_0(A, any, 1)$ can be produced directly as the output of the QKD (i.e., some bits parsed from the shared secret bits). Or, the secret signing key $X_0(A, any, 1)$ can be produced as the output of a random number generator (e.g., DNRG) with shared secret bits from QKD used as a seed value. The other user B also performs QKD with the trusted authority, producing an authentication key $AK_1(B)$ for the user B to use in signature authentication. The authentication key $AK_1(B)$ for the user B is shared between the user B and the trusted authority.

From the secret signing key $X_0(A, any, 1)$ for the user A, the trusted authority forms verification information. For example, the verification information is a non-secret SVK formed as the hash of the secret signing key: $V_0(A, any)=H(X_0(A, any, 1))$, where the subscript 0 indicates the version of verification information/batch of signing keys. The trusted authority then hashes the SVK $V_0(A, any)$ and authentication key $AK_1(B)$ for the user B, to determine a confirmation value $CV=H(V_0(A, any)\|AK_1(B))$, where $\|$ indicates concatenation of the bit strings.

The trusted authority sends the resulting confirmation value CV to the user A. The confirmation value CV is itself authenticated by the trusted authority under the key $AK_1(A)$ shared with the user A. At this point, the user A could directly determine $V_0(A, any)$ from information available to the user A (that is, from the secret signing key $X_0(A, any, 1)$) but the user A does not know $AK_1(B)$ and thus could not independently reproduce the confirmation value $CV=H(V_0(A, any)\|AK_1(B))$.

The user A signs the message M using the secret signing key $X_0(A, any, 1)$, to produce a value $sig[M_1; X_0(A, any, 1)]$. The user A appends the signature and the received confirmation value CV to the message M, and sends the entire sequence (that is, $M_1\|sig[M_1; X_0(A, any, 1)]\|CV$) to the user B.

From the signature $sig[M_1; X_0(A, any, 1)]$, the recipient B computes the verification information $V_0(A, any)$ for the sender A. The recipient B then hashes the verification information $V_0(A, any)$ for the sender A with its authentication key $AK_1(B)$ to locally determine the confirmation value for $H(V_0(A, any)\|AK_1(B))$, which the user B then compares to the received confirmation value CV provided by the sender A (which previously received the confirmation value from the trusted authority). If the confirmation values match, the sender A is authenticated for the message. Otherwise, the sender A is not authenticated for the message.

In this use scenario, only the authorized recipient B (or trusted authority) can verify the signature of the sender A. Another user may be able to determine the verification information for the sender A from the signature, but the other user will not be able to determine the confirmation value $H(V_0(A, any)\|AK_1(B))$. Thus, the signature of the sender A is a directed digital signature from the sender A to a targeted recipient B.

In a variation of this use scenario, the single signed message is sent to multiple users $B_1 \ldots B_j$. A designated recipient B can verify the signature of the sender A using its authentication key (for the designated recipient) and the confirmation value CV adapted for the designated recipient, then communicate the results of the verification to other recipients. In this case, the signature of the sender A is an arbitrated digital signature from the sender A to a designated recipient B, who verifies the sender A on behalf of a larger group of users $B_1 \ldots B_j$.

b. Multiple Unicast Messages Signed by a Single Sender

In another use scenario, a single user A signs multiple messages $M_1 \ldots M_p$ to a single user B, who may confirm the signature of the sender A on each of the messages. The number p of messages can depend on implementation, and generally corresponds to the number of signing keys if each message is signed with a different key. For example, for a streaming media scenario with an online trusted authority, the value of p can be chosen so that the time to send all p messages (for a set of p secret signing keys) is compatible with the time used to generate new shared secret bits from which a new set of p secret signing keys will be derived. Without loss of generality, consider the case where $p=2^q$, for some integer q.

As in the single-message scenario, the user A performs QKD with the trusted authority, and the shared secret bits from the QKD include an authentication key $AK_1(A)$ for the user A. The QKD also results in p secret signing keys $X_0(A, any, p)$ for the user A to use when signing messages to any other party. The p secret signing keys are shared between the user A and the trusted authority. The p secret signing keys $X_0(A, any, p)$ can be produced directly as the output of the QKD (i.e., some bits parsed from the shared secret bits). Or, the p secret signing keys $X_0(A, any, p)$ can be produced as the output of random number generator (e.g., DNRG) with shared secret bits from QKD used as a seed value. The recipient B also performs QKD with the trusted authority, producing an authentication key $AK_1(B)$ for the user B to use in signature authentication. The authentication key $AK_1(B)$ is shared between the user B and the trusted authority.

From the p secret signing keys $X_0(A, any, p)$ for the user A, the trusted authority forms verification information $V_0(A, any)$. For example, the trusted authority forms a Merkle hash tree (of depth q) whose leaf nodes are hash values of the secret signing keys $X_0(A, any, p)$, and whose root is a non-secret SVK. The trusted authority then hashes $V_0(A, any)$ and the authentication key $AK_1(B)$ for the user B, to determine the confirmation value $CV=H(V_0(A, any)\|AK_1(B))$.

The trusted authority sends the resulting confirmation value CV to the user A. The confirmation value CV is itself authenticated by the trusted authority under the key $AK_1(A)$. At this point, the user A could directly determine $V_0(A, any)$ from information available to the user A (that is, from the secret signing keys $X_0(A, any, p)$), but the user A does not know $AK_1(B)$ and thus could not independently reproduce the confirmation value $CV=H(V_0(A, any)\|AK_1(B))$.

The user A signs each message with a different secret signing key. For a message $M_z$ for $1 \le z \le p$, the user A signs the message $M_z$ using the secret signing key $X_0(A, any, z)$, to produce a value $sig[M_z; X_0(A, any, z)]$. The user A appends the signature, information about the authentication path through the hash tree (e.g., location of leaf node, authentication values for intermediate nodes, as determined by the user A), and the received confirmation value CV to the message $M_z$. The user A sends the entire sequence (that is, $M_z\|sig[M_z; X_0(A, any, z)]\|CV\|path$ information) to the user B.

For a given message $M_z$, from the signature $sig[M_z; X_0(A, any, z)]$ and the authentication path information, the recipient B computes the verification information $V_0(A, any)$ for the sender A. The recipient B then hashes the verification information $V_0(A, any)$ for the sender A with its authentication key $AK_1(B)$ to locally determine the confirmation value for $H(V_0(A, any)\|AK_1(B))$, which the user B then compares to the received confirmation value CV provided by the sender A (which previously received CV from the trusted authority). If the confirmation values match, the sender A is authenticated for the message $M_z$. Otherwise, the sender A is not authenticated for the message $M_z$.

After signing p messages, the user A can get a new set of p secret signing keys $X_1(A, any, p)$ through QKD with the trusted authority.

c. Multicast Messages Signed by a Single Sender

In another use scenario, a single user A signs multiple messages $M_1 \ldots M_p$ to each of multiple users $B_1 \ldots B_j$, each of whom may confirm the signature of the sender A on each of the messages. Again, the number of messages can depend on implementation. Without loss of generality, consider the case where $p=2^q$, for some integer q.

As in preceding scenarios, the user A performs QKD with the trusted authority, and the shared secret bits from the QKD include an authentication key $AK_1(A)$ for the user A. The QKD also results in p secret signing keys $X_0(A, any, p)$ for the user A to use when signing messages to any other party. Each of the users $B_1 \ldots B_j$ also performs QKD with the trusted authority. The trusted authority and users $B_1 \ldots B_j$ use a group keying protocol (as described above in section IV.D) to establish and distribute a group authentication key $AK_1(B_{group})$ for users in the group to use in signature authentication, where the group authentication key $AK_1(B_{group})$ can be securely shared among parties in the same way that a session key is shared in other examples of the group keying protocol. Thus, the group authentication key $AK_1(B_{group})$ is shared between the users $B_1 \ldots B_j$ and the trusted authority.

From the p secret signing keys $X_0(A, any, p)$ for the user A, the trusted authority forms verification information $V_0(A, any)$. For example, the trusted authority forms a Merkle hash tree (of depth q) whose leaf nodes are hash values of the secret signing keys $X_0(A, any, p)$, and whose root is a non-secret SVK. The trusted authority then hashes $V_0(A, any)$ and the group authentication key $AK_1(B_{group})$ for the users $B_1 \ldots B_j$, to determine the confirmation value $CV=H(V_0(A, any)\|AK_1(B_{group}))$. The trusted authority sends the resulting confirmation value CV to the user A. The confirmation value CV is itself authenticated by the trusted authority under the key $AK_1(A)$.

The user A signs each message with a different secret signing key. For a message $M_z$ for $1 \leq z \leq p$, the user A signs the message $M_z$ using the secret signing key $X_0(A, any, z)$, to produce a value $sig[M_z; X_0(A, any, z)]$. The user A appends the signature, information about the authentication path through the hash tree (e.g., location of leaf node, authentication values for intermediate nodes, as determined by the user A), and the received confirmation value CV to the message $M_z$. The user A sends the entire sequence (that is, $M_z\|sig[M_z; X_0(A, any, z)]\|CV\|$path information) to the users $B_1 \ldots B_j$.

For a given message $M_z$, from the signature $sig[M_z; X_0(A, any, z)]$ and authentication path information, each recipient within the group of users $B_1 \ldots B_j$ can compute the verification information $V_0(A, any)$ for the sender A. The recipient can then hash the verification information $V_0(A, any)$ for the sender A with the group authentication key $AK_1(B_{group})$ to locally determine the confirmation value for $H(V_0(A, any)\|AK_1(B_{group}))$, which the user from the group $B_1 \ldots B_j$ can then compare to the received confirmation value CV provided by the sender A. If the confirmation values match, the sender A is authenticated for the message $M_z$. Otherwise, the sender A is not authenticated for the message $M_z$.

In this use scenario, a single one of the users $B_1 \ldots B_j$ can perform the verification, then communicate the results to other users in the group, to provide arbitrated digital signature functionality. Or, each of the users $B_1 \ldots B_j$ can independently verify the sender A.

d. Multicast Messages Signed by Multiple Senders

In another use scenario, multiple users $A_1 \ldots A_i$ sign multiple messages $M_1 \ldots M_p$ to each of multiple users $B_1 \ldots B_j$, each of whom may confirm the signature of a sender $A_1 \ldots A_i$ on each of the messages. Again, the number of messages can depend on implementation. Without loss of generality, consider the case where $p=2^q$, for some integer q. Another simplifying assumption, for the sake of presentation, is that each of the senders $A_1 \ldots A_i$ has the same number of messages to send, but in practice different senders can send different numbers of messages. Again, without loss of generality, consider the case where the number of senders is $i=2^r$, for some integer r.

Each user $A_y$ for $1 \leq y \leq i$ performs QKD with the trusted authority, and the shared secret bits from the QKD include an authentication key $AK_1(A_y)$ for the user $A_y$. The QKD also results in p secret signing keys $X_0(A_y, any, p)$ for the user $A_y$ to use when signing messages to any other party. As in other scenarios, the p secret signing keys $X_0(A_y, any, p)$ for the user $A_y$ can be parsed directly from shared secret bits resulting from QKD, or the shared secret bits can be input to a random number generator that outputs the p secret signing keys for the user $A_y$.

Each of the users $B_1 \ldots B_j$ also performs QKD with the trusted authority. The trusted authority and users $B_1 \ldots B_j$ use a group keying protocol to establish and distribute a group authentication key $AK_1(B_{group})$ for users in the group to use in signature authentication, as described above. The group authentication key $AK_1(B_{group})$ is shared between the users $B_1 \ldots B_j$ and the trusted authority.

For each user $A_y$ for $1 \leq y \leq i$, the trusted authority forms verification information $V_0(A_y, any)$ from the p secret signing keys $X_0(A_y, any, p)$ for that user $A_y$. For example, the trusted authority forms a Merkle hash tree (of depth q) whose leaf nodes are hash values of the secret signing keys $X_0(A_y, any, p)$, and whose root is a non-secret SVK for that user $A_y$. From the $V_0(A_y, any)$ of the respective senders, the trusted authority forms another Merkle hash tree (of depth r) whose leaf nodes are hash values of $V_0(A_y, any)$ for the respective senders, and whose root is a non-secret group verification $V_0(A_{group}, any)$ for the group of senders $A_1 \ldots A_i$.

The trusted authority then hashes the group SVK $V_0(A_{group}, any)$ for the group of senders $A_1 \ldots A_i$ and the group authentication key $AK_1(B_{group})$ for the group of receivers $B_1 \ldots B_j$, to determine the confirmation value $CV=H(V_0(A_{group}, any)\|AK_1(B_{group}))$. The trusted authority sends the resulting confirmation value CV to each of the users $A_1 \ldots A_i$, along with appropriate authentication path information for the group Merkle hash tree (depth r). For a given user $A_y$, the authentication path information for the group Merkle hash tree includes a leaf node position and intermediate nodes to reach the group $V_0(A_{group}, any)$ from the leaf node $V_0(A_y, any)$ for that user $A_y$. The confirmation value CV and authentication path can be authenticated by the trusted authority under the key $AK_1(A_y)$.

A given user $A_y$ signs each message with a different secret signing key. For a message $M_{z,y}$ for $1 \leq z \leq p$ from user $A_y$, the user $A_y$ signs the message $M_{z,y}$ using the secret signing key $X_0(A_y, any, z)$, to produce a value $sig[M_{z,y}; X_0(A_y, any, z)]$. The user $A_y$ appends the signature, information about the authentication path through its hash tree (e.g., location of leaf node, authentication values for intermediate nodes, as determined by the user $A_y$), information about the authentication path through the group hash tree (received from the trusted authority) and the received confirmation value CV to the message $M_z$. The user $A_y$ sends the entire sequence (that is, $M_{z,y}\|sig[M_{z,y}; X_0(A_y, any, z)]\|CV\|$path information for hash tree of $A_y$ to $V_0(A_y, any)\|$ path information for group hash tree to $V_0(A_{group}, any))$ to the users $B_1 \ldots B_j$.

For a given message $M_{z,y}$ from sender $A_y$, from the signature $sig[M_{z,y}; X_0(A_y, any, z)]$ and authentication path information for the hash tree of sender $A_y$, each recipient within the group of users $B_1 \ldots B_j$ can compute the verification information $V_0(A_y, any)$ for the sender $A_y$. The recipient can then use $V_0(A_y, any)$ and the authentication path information for the group hash tree to compute $V_0(A_{group}, any)$. Next, the recipient can hash the verification information $V_0(A_{group}, any)$ for the group of senders $A_1 \ldots A_i$ with the group authentication key $AK_1(B_{group})$ to locally determine the confirmation value for $H(V_0(A_{group}, any)\|AK_1(B_{group}))$, which the user from the group $B_1 \ldots B_j$ can compare to the received confirmation value CV provided by the sender $A_y$. If the confirmation values match, the sender $A_y$ is authenticated for the message $M_{z,y}$. Otherwise, the sender $A_y$ is not authenticated for the message $M_{z,y}$.

B. Generalized Techniques for Establishing Digital Signature Information

FIG. 13 shows a generalized technique (1300) for establishing digital signature information in an environment with multiple user devices and a system that implements a trusted authority for managing QKD in the environment. A system that implements a registration authority, a user device or another entity performs the technique (1300). The system that implements the registration authority can be the same as the system that implements the trusted authority, or the registration authority and trusted authority can be implemented in different systems in secure communication with each other.

To start, the entity generates (1310) one or more digital signature keys. For example, the one or more digital signature keys are Winternitz one-time digital signature keys. Alternatively, the one or more digital signature keys are another type of one time-digital signature keys. The entity transmits (1320) verification information for the one or more digital signature keys. For example, the verification information is a signature verification key of a Merkle hash tree, the Merkle hash tree having the signature verification key as its root node value. Alternatively, the verification information takes another form appropriate for a given type of digital signature key.

For example, when a user device is the entity that performs the generating and the transmitting, the user device generates digital signature keys to identify itself or certify messages on behalf of itself, and the user transmits verification information to the system that implements the registration authority. The registration authority can itself use the verification information, convey it to other user devices (in its role as certificate authority), or convey it to a separate certificate authority.

Or, when the system that implements the registration authority performs the generating and the transmitting, the system generates digital signature keys for use in identification of or certification by a certificate authority (typically, the trusted authority/registration authority, but possibly implemented in a separate system). The system transmits the verification information to a user device or multiple user devices. The registration authority can use the same set of digital signature keys (and verification information) for multiple user devices, or generate different sets of keys (and create and transmit different verification information) for different devices.

Or, multiple user devices and the system that implements the registration authority can each perform the generating and transmitting digital signature keys for the respective entities. Alternatively, the system that implements the registration authority (typically, the trusted authority/registration authority) can generate and transmit (e.g., securely transmit) digital signature keys that a given user device will then use to identify itself or certify messages on behalf of that user device.

The technique (1300) shown in FIG. 13 can be performed during an initial enrollment stage in which a user device is in physical proximity with the system that implements the registration authority. Or, the technique (1300) can be performed during a replenishment stage. For example, an entity identifies a key established in QKD between a user device and the system that implements the trusted authority, and the entity uses the key to establish secure communication between the user device and the system that implements the registration authority, wherein the verification information is transmitted as part of the secure communication.

C. Generalized Techniques for Asserting Identity

FIG. 14 shows a generalized technique (1400) for asserting identity or certification in an environment with multiple user devices and a system that implements a trusted authority for managing QKD in the environment. A system that implements a certificate authority, a user device or another entity performs the technique (1400). The system that implements the certificate authority can be the same as the system that implements the trusted authority, or the certificate authority and trusted authority can be implemented in different systems in secure communication with each other.

To start, the entity signs (1410) a message with a digital signature. For example, the entity uses a one-time digital signature key such as a Winternitz key associated with a leaf node of a Merkle hash tree. The entity transmits (1420) the message and the digital signature for the message.

When the system that implements the certificate authority performs the signing and the transmitting, the message and the digital signature can be transmitted to a first user device, where the message is a non-secret key of a second user device. For example, the non-secret key includes a combination key based upon a key derivation key available at the first user device and an encryption key available at the second user device, such that the combination key and key derivation key are usable by the first user device to determine the encryption key. The non-secret key can further include a key authentication value based upon the encryption key and a key authentication key available at the first user device, such that the first user device can authenticate the encryption key using the key authentication key and the key authentication value.

Alternatively, when a first user device performs the signing and the transmitting, the message and the digital signature can be transmitted to a second first user device, where the message is encrypted using an encryption key derived at the first user device and available at the second user device.

D. Generalized Techniques for Verifying Identity

FIG. 15 shows a generalized technique (1500) for verifying identity or certification in an environment with multiple user devices and a system that implements a trusted authority for managing QKD in the environment. A system that implements a certificate authority, a user device or another entity performs the technique (1500). The system that implements the certificate authority can be the same as the system that implements the trusted authority, or the certificate authority and trusted authority can be implemented in different systems in secure communication with each other.

To start, the entity receives (1510) a message and a digital signature for the message. For example, the digital signature is based at least in part on a Winternitz one-time digital signature key. The entity checks (1520) the digital signature. For example, the checking uses a signature verification key of a Merkle hash tree, the Merkle hash tree having the signature verification key as its root node value.

When a first user device performs the receiving and the checking, the checking can use verification information received from the system that implements the certificate authority to check identification of or certification by the certificate authority for the digital signature for the message. For example, the message is a non-secret key of a second user device, the non-secret key including a combination key based upon a key derivation key available at the first user device and an encryption key available at the second user device.

Or, when a second user device (as recipient of a message from first user device) performs the receiving and the checking, a second message can be received from the system that implements the certificate authority, where the second message is first user verification information for the first user device. In this case, the second user device uses certificate authority verification information to check identification of or certification by the certificate authority for the digital signature for the second message. The second user device can also use the first user verification information to check identification of or certification by the first user device for the digital signature for the message from the first user device.

E. Generalized Techniques for Verifying Credentials

Figure 16:
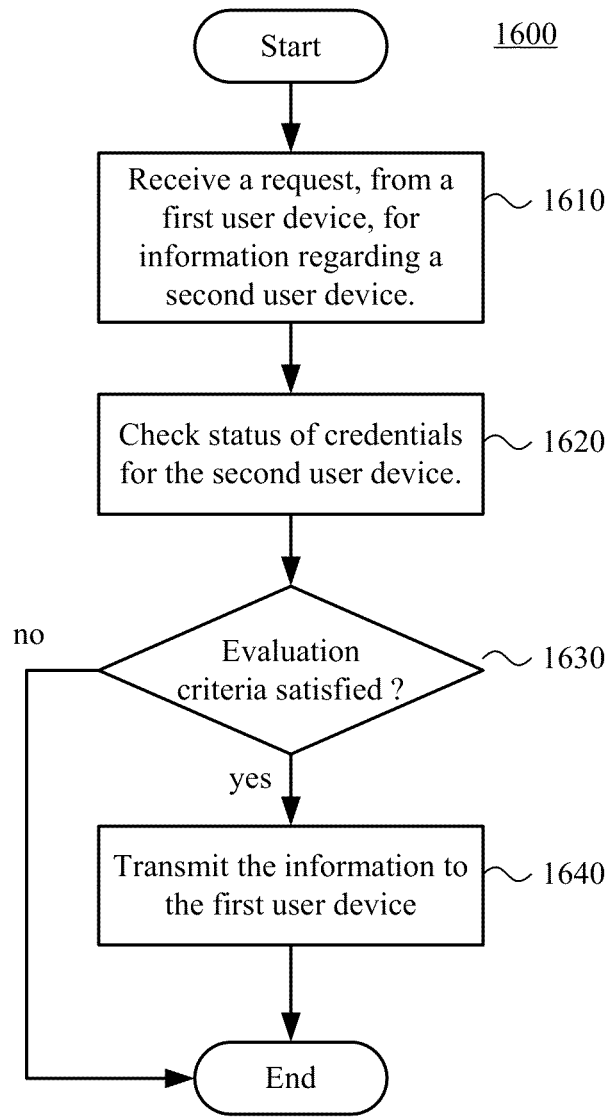

FIG. 16 shows a generalized technique (1600) for verifying credentials in an environment with multiple user devices and a system that implements a trusted authority for managing QKD in the environment. A system that implements a certificate authority performs the technique (1600).

To start, the system receives (1610) a request, from a first user device, for information regarding a second user device. For example, the information is a non-secret key of the second user device or verification information for the second user device.

The system checks (1620) the status of credentials for the second user device. If the status of credentials for the second user device satisfies one or more evaluation criteria (1630) (e.g., credentials not revoked), the system transmits (1640) the information to the first user device. Otherwise, the system does transmit the information or transmits an error message to the first user device.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of establishing a public key infrastructure (PKI) using a trusted authority in communication with a plurality of user devices using quantum communications, the method comprising:
   at a receiving user device of the plurality of user devices:
      receiving, from a sending user device of the plurality of user devices, (i) a message and (ii) a sending user device digital signature based on the message and a one-time digital signature key associated with the sending user device;
      receiving, from the trusted authority, (i) verification information associated with the sending user device, and (ii) a trusted authority digital signature based on the verification information and a one-time digital signature key associated with a connection between the receiving user device and the trusted authority;
      checking the trusted authority digital signature using verification information associated with the trusted authority previously received from the trusted authority;
      if the trusted authority digital signature is valid, checking the sending user device digital signature using the verification information associated with the sending user device received from the trusted authority; and
      replenishing a supply of one-time digital signature keys associated with the connection between the receiving user device and the trusted authority using a quantum communication session between the receiving user device and the trusted authority.

2. The method of claim 1, further comprising conducting a quantum communication session between the sending user device and the trusted authority to establish a set of user-to-user keys for establishing communications between the sending user device and other user devices of the plurality of user devices.

3. The method of claim 1, further comprising:
   receiving, at the trusted authority, a request from the sending user device for key information regarding the receiving user device;
   determining, at the trusted authority, whether credentials registered at the trusted authority and associated with at least one of the sending user device and the receiving user device are valid; and
   when the credentials are determined to be valid, sending the requested key information from the trusted authority to the sending user device.

4. The method of claim 3, further comprising:
   when the credentials are determined to not be valid, sending a warning message to the sending user device.

5. The method of claim 3, further comprising:
   when the credentials are determined to not be valid, refusing to send the requested key information to the sending user device.

6. The method of claim 2, further comprising:
   receiving, at the trusted authority, a request from the sending user device for key information regarding the receiving user device; and
   sending the requested key information to the second user device, wherein the requested key information is based on at least part of the set of user-to-user keys for establishing communication between the sending user device and other user devices.

7. The method of claim 6, further comprising:
   generating, at the trusted authority, a digital signature based on the requested key information and a one-time digital signature key associated with a connection between the sending user device and the trusted authority; and
   sending the generated digital signature to the sending user device.

8. The method of claim 2, wherein the set of user-to-user keys comprise at least one unique key for every other user device.

9. The method of claim 1, further comprising replenishing a supply of one-time digital signature keys associated with the sending user device using a quantum communication session between the sending user device and the trusted authority.

10. The method of claim 1, wherein replenishing the supply of one-time digital signature keys associated with the connection between the receiving user device and the trusted authority comprises generating the supply of one-time digital signature keys using a random number generation function that utilizes a set of bits established by the quantum communication session between the receiving user device and the trusted authority as a seed value.

11. The method of claim 1, wherein the verification information associated with the trusted authority is associated with multiple one-time digital signature keys associated with the connection between the receiving user device and the trusted authority.

12. The method of claim 1, further comprising:
   conducting, at the trusted authority, quantum communication sessions with each user device of the plurality of user devices to establish a set of user-to-user keys; and
   publishing, by the trusted authority, information regarding the set of user-to-user keys so that the information is accessible to the plurality of user devices when the trusted authority is offline.

13. The method of claim 1, wherein replenishing the supply of one-time digital signature keys comprises:
- establishing an encryption key for encrypting communications between the trusted authority and the receiving user device using the quantum communication session;
- generating, at the trusted authority, (i) the supply of one-time digital signature keys using a random number generator and (ii) verification information based on the supply of one-time digital signature keys;
- encrypting, at the trusted authority, the verification information based on the supply of one-time digital signature keys using the encryption key; and
- sending the encrypted verification information from the trusted authority to the receiving user device.

14. The method of claim 1, further comprising:
- enrolling each user device of the plurality of user devices by:
  - determining, at the trusted authority, an initial trusted authority digital signature key for authenticating communications between the trusted authority and the corresponding user device, and initial verification information for the corresponding user device based on the initial trusted authority digital signature key; and
  - sending the initial trusted authority digital signature key to the corresponding user device.

15. A method of using a public key infrastructure (PKI) implemented by a trusted authority in communication with a plurality of user devices using quantum communications, the method comprising:
- receiving, at the trusted authority from a first user device of the plurality of user devices, a request for verification information associated with a one-time digital signature key associated with a second user device of the plurality of user devices;
- sending, in response to the request, (i) the verification information, and (ii) a trusted authority digital signature based on the verification information and a one-time digital signature key associated with a connection between the first user device and the trusted authority; and
- replenishing a supply of one-time digital signature keys associated with the connection between the first user device and the trusted authority using a quantum communication session between the first user device and the trusted authority.

16. The method of claim 15, further comprising conducting, at the trusted authority, a quantum communication session with each user device of the plurality of user devices to establish a set of user-to-user keys for establishing communication between each user device and each other user device of the plurality of user devices.

17. The method of claim 16, further comprising:
- receiving, at the trusted authority from the second user device, a request for key information regarding the first user device;
- generating, at the trusted authority, the requested key information based on the set of user-to-user keys;
- sending, from the trusted authority to the second user device, the requested key information so as to enable the second user device to derive an encryption key for encrypting communications between the second user device and the first user device.

18. The method of claim 16, wherein the set of user-to-user keys comprise at least one unique key for every user device.

19. The method of claim 15, further comprising:
- replenishing a supply of one-time digital signature keys associated with the second user device based on a quantum communication session between the trusted authority and the second user device.

20. The method of claim 19, wherein replenishing the supply of one-time digital signature keys associated with the second user device comprises generating a plurality of one-time digital signature keys using a random number generation function that utilizes a set of bits established by the quantum communication session between the trusted authority and the second user device as a seed value.

21. The method of claim 19, further comprising determining verification information based on the supply of one-time digital signature keys associated with the second user device.

22. The method of claim 16, wherein:
- the quantum communication session with each user device also establishes an encryption key for encrypting communications between the trusted authority and the corresponding user device.

23. The method of claim 16, further comprising:
- enrolling each user device of the plurality of user devices with the trusted authority by:
  - sending, from each user device to the trusted authority, a secret password for establishing the quantum communication session between the corresponding user device and the trusted authority; and
  - receiving, at each user device, initial verification information from the trusted authority, wherein the initial verification information is for authenticating communications between the trusted authority and the corresponding user device.

* * * * *